United States Patent
Liang et al.

(10) Patent No.: US 12,517,252 B2
(45) Date of Patent: Jan. 6, 2026

(54) THREE-DIMENSIONAL OBJECT DETECTION

(71) Applicant: Aurora Operations, Inc., Pittsburgh, PA (US)

(72) Inventors: Ming Liang, Toronto (CA); Bin Yang, Toronto (CA); Shenlong Wang, Toronto (CA); Wei-Chiu Ma, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 417 days.

(21) Appl. No.: 17/971,069

(22) Filed: Oct. 21, 2022

(65) Prior Publication Data

US 2023/0127115 A1    Apr. 27, 2023

Related U.S. Application Data

(63) Continuation of application No. 16/353,457, filed on Mar. 14, 2019, now Pat. No. 11,500,099.
(Continued)

(51) Int. Cl.
   *G01S 17/89*     (2020.01)
   *G01S 7/481*     (2006.01)
   (Continued)

(52) U.S. Cl.
   CPC ............ *G01S 17/89* (2013.01); *G01S 7/4817* (2013.01); *G01S 17/931* (2020.01);
   (Continued)

(58) Field of Classification Search
   None
   See application file for complete search history.

(56) References Cited

U.S. PATENT DOCUMENTS

| 9,756,172 B2 | 9/2017 | Piemonte et al. |
| 10,565,786 B1 * | 2/2020 | Klein ............... G06F 3/04815 |

(Continued)

OTHER PUBLICATIONS

Wang, Shenlong, et al. "Deep parametric continuous convolutional neural networks." Proceedings of the IEEE conference on computer vision and pattern recognition. 2018. (Year: 2018).*

(Continued)

*Primary Examiner* — Luke D Ratcliffe
(74) *Attorney, Agent, or Firm* — Dority & Manning, P.A.

(57) ABSTRACT

Generally, the disclosed systems and methods implement improved detection of objects in three-dimensional (3D) space. More particularly, an improved 3D object detection system can exploit continuous fusion of multiple sensors and/or integrated geographic prior map data to enhance effectiveness and robustness of object detection in applications such as autonomous driving. In some implementations, geographic prior data (e.g., geometric ground and/or semantic road features) can be exploited to enhance three-dimensional object detection for autonomous vehicle applications. In some implementations, object detection systems and methods can be improved based on dynamic utilization of multiple sensor modalities. More particularly, an improved 3D object detection system can exploit both LIDAR systems and cameras to perform very accurate localization of objects within three-dimensional space relative to an autonomous vehicle. For example, multi-sensor fusion can be implemented via continuous convolutions to fuse image data samples and LIDAR feature maps at different levels of resolution.

20 Claims, 17 Drawing Sheets

Related U.S. Application Data

(60) Provisional application No. 62/753,434, filed on Oct. 31, 2018, provisional application No. 62/685,708, filed on Jun. 15, 2018, provisional application No. 62/643,072, filed on Mar. 14, 2018.

(51) Int. Cl.

| | | |
|---|---|---|
| *G01S 17/931* | (2020.01) | |
| *G05D 1/00* | (2006.01) | |
| *G06F 18/25* | (2023.01) | |
| *G06N 3/02* | (2006.01) | |
| *G06N 3/04* | (2023.01) | |
| *G06N 3/08* | (2023.01) | |
| *G06V 10/764* | (2022.01) | |
| *G06V 10/80* | (2022.01) | |
| *G06V 20/56* | (2022.01) | |
| *G06V 20/64* | (2022.01) | |

(52) U.S. Cl.
CPC ......... *G05D 1/0231* (2013.01); *G06F 18/253* (2023.01); *G06N 3/02* (2013.01); *G06N 3/04* (2013.01); *G06N 3/08* (2013.01); *G06V 10/764* (2022.01); *G06V 10/803* (2022.01); *G06V 20/56* (2022.01); *G06V 20/64* (2022.01); *G06T 2207/30261* (2013.01)

(56) References Cited

U.S. PATENT DOCUMENTS

| | | | |
|---|---|---|---|
| 2015/0138310 | A1 | 5/2015 | Fan et al. |
| 2018/0025234 | A1 | 1/2018 | Myers et al. |
| 2018/0189578 | A1 | 7/2018 | Yang et al. |
| 2018/0232947 | A1 | 8/2018 | Nehmadi et al. |
| 2018/0348346 | A1 | 12/2018 | Vallespi-Gonzalez et al. |
| 2019/0102692 | A1 | 4/2019 | Kwant et al. |
| 2019/0147331 | A1 | 5/2019 | Arditi |
| 2019/0147610 | A1* | 5/2019 | Frossard ............... G06N 3/045 382/103 |
| 2019/0163990 | A1 | 5/2019 | Mei et al. |
| 2019/0188541 | A1* | 6/2019 | Wang ..................... G01S 7/4802 |

OTHER PUBLICATIONS

Ma et al, "Forecasting interactive Dynamics of Pedestrians with Fictitious Play", arXiv:1604.01431v3, Mar. 28, 2017, 9 pages.
Park et al, "Egocentric Future Localization", Conference on Computer Vision and Pattern Recognition, June 26-Jul. 1, 2016, Las Vegas, Nevada, United States, pp. 4697-4705.
Phillips et al, "Generalizable Intention Prediction of Human Drivers at Intersections", Intelligent Vehicle Symposium, Jun. 11-14, 2017, Redondo Beach, California, United States, 6 pages.
Qi et al, "Frustum PointNets for 3D Object Detection from RGB-D Data", arXiv:1711.08488v2, Apr. 13, 2018, 15 pages.
Qi et al, "PointNet: Deep Learning On Point Sets for 3D Classification and Segmentation", arXiv:1612.00593v2, Apr. 10, 2017, 19 pages.
Redmon et al, "You Only Look Once: Unified, Real-Time Object Detection", In: Proceedings of the Conference on Computer Vision and Pattern Recognition, June 26-Jul. 1, 2016, Las Vegas, Nevada, United States, pp. 779-788.
Ren et al, Faster R-CNN: Towards Real-Time Object Detection with Region Proposal Networks. Conference on Neural Information Processing Systems, Dec. 7-12, 2015, Montreal, Canada, 9 pages.
Silberman et al, "Indoor Segmentation and Support Inference from RGBD Images", Conference on Computer Vision and Pattern Recognition, Jun. 16-21, 2012, Providence, Rhode Island, United States, pp. 746-760.
Simon et al, "Complex-YOLO: Real-Time 3D Object Detection on Point Clouds", arXiv:1803.06199v2, Sep. 24, 2018, 14 pages.
Snoek et al, "Early Versus Late Fusion in Sematic Video Analysis", International Conference on Multimedia, Nov. 6-11, 2005, Singapore, 4 pages.
Song et al, "Deep Sliding Shapes for Amodal 3D Object Detection In RGB-D Images", arXiv:1511.02300v2, Mar. 9, 2016, 10 pages.
Song et al, "Sliding Shapes for 3D Object Detection in Depth Images", Conference on Computer Vision and Pattern Recognition, Jun. 23-28, 2014, Columbus, Ohio, United States, 18 pages.
Streubel et al, "Prediction of Driver Intended Path at Intersections" Intelligent Vehicle Symposium, Dearborn, Michigan, United States, Jun. 8-11, 2014, 6 pages.
Sutton et al, "Reinforcement Learning: An Introduction", Second Edition, 2014, The MIT Press, Cambridge, Massachusetts, 352 pages.
Tran et al, "Learning Spatiotemporal features with 3D Convolutional Networks", arXiv:1412.0767v4, Oct. 7, 2015, 16 pages.
Yang et al, "PIXOR: Real-Time 3D Object Detection for Point Clouds", arXiv:1902.06326v3, Mar. 2, 2019, 10 pages.
Yu et al, "Vehicle Detection and Localization on Bird's Eye View Elevation Images Using Convolutional Neural Network", International Symposium on Safety, Security and Rescue Robotics, Oct. 11-13, 2017, Shanghai, China, pp. 102-109.
Zhang et al, "Sensor Fusion for Semantic Segmentation of Urban Scenes", International Conference on Robotics and Automation, May 26-30, 2015, Seattle, Washington, United States, pp. 1850-1857.
Zhou et al, "VoxelNet: End-to-End Learning for Point Cloud Based 3D Object Detection", arXiv:1711.06396v1, Nov. 17, 2017, 10 pages.
Ballan et al, "Knowledge Transfer for Scene-Specific Motion Prediction", European Conference on Computer Vision, Oct. 8-16, 2016, Amsterdam, The Netherlands, 16 pages.
Chen et al, "3D Object Proposals for Accurate Object Class Detection", Conference on Neural Information Processing Systems, Dec. 7-12, 2015, Montreal, Canada, 9 pages.
Chen et al, "3D Object Proposals Using Stereo Imagery for Accurate Object Class Detection", arXiv:1608.07711v2, Apr. 25, 2017, 14 pages.
Chen et al, "Monocular 3D Object Detection for Autonomous Driving", Conference on Computer Vision and Pattern Recognition, Jun. 26-Jul. 1, 2016, Las Vegas, Nevada, United States, 10 pages.
Chen et al, "Multi-View 3D Object Detection Network for Autonomous Driving", arXiv:1611.07759v3, Jun. 22, 2017, 9 pages.
Dai et al, "R-FCN: Object Detection via Region-Based Fully Convolutional Networks", arXiv:1605.06409v2, Jun. 21, 2016, 11 pages.
Du et al, "A General Pipeline for 3D Detection of Vehicles", arXiv:1803.00387v1, Feb. 12, 2018, 7 pages.
Eitel et al, "Multimodal Deep Learning for Robust RGB-D Object Recognition", arXiv:1507.06821v2, Aug. 18, 2015, 7 pages.
Engelcke et al, "Vote3Deep: Fast Object Detection in 3D Point Clouds Using Efficient Convolutional Neural Networks", arXiv:1609.06666v2, Mar. 5, 2017, 7 pages.
Fathi et al, "Learning to Recognize Daily Actions Using Gaze", European Conference on Computer Vision, Oct. 7-13, 2012, Firenze, Italy, 14 pages.
Geiger et al, "Are We Ready for Autonomous Driving? The Kitti Vision Benchmark Suite", Conference on Computer Vision and Pattern Recognition, Jun. 16-21, 2012, Providence, Rhode Island, United States, 8 pages.
Geiger et al, "Vision Meet Robotics: The KITTI Dataset", The International Journal of Robotics Research, vol. 32, No. 11, Sep. 2013, 6 pages.
Girshick et al, "Rich Feature Hierarchies for Accurate Object Detection and Semantic Segmentation", arXiv:1311.2524v5, Oct. 22, 2014, 21 pages.
Girshick, "Fast R-CNN", arXiv:1504.08083v2, Sep. 27, 2015, 9 pages.
Glorot et al, "Understanding the Difficulty of Training Deep Feedforward Neural Networks", Conference on Artificial Intelligence and Statistics, May 13-15, 2010, Sardinia, Italy, pp. 249-256.

(56) References Cited

OTHER PUBLICATIONS

Gupta et al, Learning Rich Features from RGB-D Images for Object Detection and Segmentation, arXiv:1407.5736v1, Jul. 22, 2014, 16 pages.
He et al, "Deep Residual Learning for Image Recognition", arXiv:1512.03385v1, Dec. 10, 2015, 12 pages.
Hoermann et al, "Dynamic Occupancy Grid Prediction for Urban Autonomous Driving: A Deep Learning Approach with Fully Automatic Labeling", arXiv:1705.08781v2, Nov. 7, 2017, 8 pages.
Howard et al, "MobileNets: Efficient Convolutional Neural Networks for Mobile Vision Applications", arXiv:1704.04861v1, Apr. 17, 2017, 9 pages.
Hu et al, "Probabilistic Prediction of Vehicle Semantic Intention and Motion", arXiv:1804.03629v1, Apr. 10, 2018, 7 pages.
Iandola et al, "SqueezeNet: AlexNet-Level Accuracy with 50x Fewer Parameters and <0.5 mb Model Size", arXiv:1602.07360v4, Nov. 4, 2016, 13 pages.
Jain et al, "Car That Knows Before You Do: Anticipating Maneuvers via Learning Temporal Driving Models". arXiv:1504.02789v2, Sep. 19, 2015, 9 pages.
Kim et al, "Prediction of Drivers Intention of Lane Change by Augmenting Sensor Information using Machine Learning Techniques", Sensors, vol. 17, 2017, 18 pages.
Kingma et al, "Adam: A Method for Stochastic Optimization", arXiv:1412.6980v9, Jan. 30, 2017, 15 pages.
Ku et al, "Joint 3D Proposal Generation and Object Detection from View Aggregation", arXiv:1712.02294v4, Jul. 12, 2018, 8 pages.
Lee et al, "Desire: Distant Future Prediction in Dynamic Scenes with Interacting Agents", arXiv:1704.04394v1, Apr. 14, 2017, 10 pages.
Lewis et al, "Sensor Fusion Weighting Measures in Audio-Visual Speech Recognition", Australasian Conference on Computer Science, Jan. 2004, Dunedin, New Zealand, 10 pages.
Li et al, "Vehicle Detection from 3D Lidar Using Fully Convolutional Network", arXiv:1608.07916v1, Aug. 29, 2016, 8 pages.
Li, "3D Fully Convolutional Network for Vehicle Detection in Point Cloud", arXiv:1611.08069v2, Jan. 16, 2017, 5 pages.
Lin et al, "Feature Pyramid Networks for Object Detection", arXiv:1612.03144v2, Apr. 19, 2017, 10 pages.
Lin et al, "Focal Loss for Dense Object Detection", Conference on Computer Vision, Oct. 22-29, 2017, Venice, Italy, pp. 2980-2988.
Liu et al, "SSD: Single Shot Multibox Detector", arXiv:1512.02325v5, Dec. 29, 2016, 17 pages.
Luo et al, "Fast and Furious: Real Time End-to-End 3D Detection, Tracking and Motion Forecasting with a Single Convolutional Net", arXiv:2012.12395v1. Dec. 22, 2020, 9 pages.
Luo et al, "Understanding the Effective Receptive Field in Deep Convolutional Neural Networks" arXiv:1701.04128v2, Jan. 25, 2017, 9 pages.
Park et al, "Egocentric Future Localization", Conference on Computer Vision and Pattern Recognition, Jun. 26-Jul. 1, 2016, Las Vegas, Nevada, United States, pp. 4697-4705.
Redmon et al, "You Only Look Once: Unified, Real-Time Object Detection", In: Proceedings of the Conference on Computer Vision and Pattern Recognition, Jun. 26-Jul. 1, 2016, Las Vegas, Nevada, United States, pp. 779-788.
U.S. Appl. No. 16/353,463, filed Mar. 14, 2019, 90 pages.
U.S. Appl. No. 17/571,845, filed Jan. 10, 2022, 88 pages,.

* cited by examiner

THREE-DIMENSIONAL OBJECT DETECTION

PRIORITY CLAIM

The present application is a continuation of U.S. patent application Ser. No. 16/353,457, filed Mar. 14, 2019. U.S. patent application Ser. No. 16/353,457 is hereby incorporated by reference herein in its entirety. U.S. patent application Ser. No. 16/353,457 is based on and claims benefit of U.S. Provisional Application No. 62/643,072, filed Mar. 14, 2018; U.S. Provisional Application No. 62/685,708, filed Jun. 15, 2018; and U.S. Provisional Application No. 62/753,434, filed Oct. 31, 2018, all of which are hereby incorporated by reference herein in their respective entireties.

FIELD

The present disclosure relates generally to detection of an object using sensors.

BACKGROUND

A machine such as an autonomous vehicle is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to an object detection system that includes a LIDAR system, a map system, a fusion system, and a detector system. The LIDAR system is configured to capture LIDAR point cloud data associated with an environment surrounding an autonomous vehicle. The map system is configured to provide geographic prior data regarding the environment surrounding the autonomous vehicle. The fusion system is configured to modify, based on the geographic prior data, the LIDAR point cloud data representing a three-dimensional view of the environment into map-modified LIDAR data having a plurality of layers, each layer representing a two-dimensional view of the environment. The detector system is configured to detect, based on the map-modified LIDAR data, three-dimensional objects of interest within the environment.

Another example aspect of the present disclosure is directed to a computer-implemented method. The method includes obtaining, by a computing system comprising one or more computing devices, LIDAR point cloud data associated with an environment surrounding an autonomous vehicle. The method also includes projecting, by the computing system, the LIDAR point cloud data to a bird's eye view representation of the LIDAR point cloud data. The method also includes obtaining, by the computing system, geographic prior data regarding the environment surrounding the autonomous vehicle. The method also includes modifying, by the computing system, the bird's eye view representation of the LIDAR point cloud data based on the geographic prior data into map-modified LIDAR data having a plurality of layers, each layer representing a two-dimensional view of the environment. The method also includes detecting, by the computing system, based on the map-modified LIDAR data, three-dimensional objects of interest within the environment.

Another example aspect of the present disclosure is directed to an autonomous vehicle that includes a LIDAR system, a fusion system, a detector system, a motion planning system, and a vehicle control system. The LIDAR system is configured to capture LIDAR point cloud data representing a three-dimensional view of an environment surrounding an autonomous vehicle. The fusion system is configured to access geographic prior data regarding the environment surrounding the autonomous vehicle and to modify the LIDAR point cloud data based on the geographic prior data into map-modified LIDAR data having a plurality of layers, each layer representing a two-dimensional view. The detector system is configured to detect, based on the map-modified LIDAR data, three-dimensional objects of interest within the environment. The motion planning system is configured to determine a motion plan for the autonomous vehicle based at least in part on the detected three-dimensional objects of interest. The vehicle control system is configured to control motion of the autonomous vehicle to implement the motion plan.

Another example aspect of the present disclosure is directed to an object detection system that includes a camera system configured to capture image data associated with an environment surrounding an autonomous vehicle, a LIDAR system configured to capture LIDAR point cloud data associated with the environment surrounding the autonomous vehicle, one or more processors, and one or more non-transitory computer-readable media. The one or more non-transitory computer-readable media stores a machine-learned neural network that comprises one or more fusion layers, wherein at least one of the one or more fusion layers is configured to fuse image features from the image data at a first level of resolution with LIDAR features from the LIDAR point cloud data at a second level of resolution that is different than the first level of resolution. The one or more non-transitory computer-readable media stores instructions that, when executed by the one or more processors, cause the computing system to perform operations. The operations include generating, at the machine-learned neural network, a first data stream descriptive of the image data and a second data stream descriptive of the LIDAR point cloud data. The operations also include executing, at the machine-learned neural network, one or more continuous convolutions to fuse the image features from the first data stream with the LIDAR features from the second data stream. The operations also include generating a feature map comprising the fused image features from the first data stream and the LIDAR features from the second data stream.

Another example aspect of the present disclosure is directed to one or more non-transitory computer-readable media that store a machine-learned neural network that comprises one or more fusion layers, wherein at least one of the one or more fusion layers is configured to fuse input data of first and second different resolutions and first and second different sensor modalities associated with an autonomous vehicle, the at least one of the one or more fusion layers includes a multi-layer perceptron having a first portion configured to extract a plurality of source data points from a source domain associated with the first sensor modality given a target data point in a target domain associated with the second sensor modality, the multi-layer perceptron having a second portion configured to encode an offset between each of the plurality of source data points from the source domain and the target data point in the target domain.

Another example aspect of the present disclosure is directed to a computer-implemented method. The computer-implemented method includes obtaining, by a computing system comprising one or more computing devices, access to a machine-learned neural network that comprises one or more fusion layers, wherein at least one of the one or more fusion layers is configured to implement a continuous convolution to fuse image features from image data at a first level of resolution with LIDAR features from LIDAR point cloud data at a second level of resolution that is different from the first level of resolution. The computer-implemented method also includes receiving, by the computing system, one or more target data points associated with the image data. The computer-implemented method includes extracting, by the computing system and for each target data point, a plurality of source data points associated with the LIDAR point cloud data based on a distance of each source data point to the target data point. The computer-implemented method also includes fusing, by the computing system, information from the plurality of source data points in the one or more fusion layers to generate an output feature at each target data point. The computer-implemented method also includes generating, by the computing system, a feature map comprising the output feature at each of the one or more target data points.

Another example aspect of the present disclosure is directed to an object detection system that includes a camera system, a LIDAR system, a map system, a fusion system, and a detector system. The camera system is configured to capture image data associated with an environment surrounding an autonomous vehicle. The LIDAR system is configured to capture LIDAR point cloud data associated with the environment surrounding the autonomous vehicle. The map system is configured to provide geographic prior data regarding the environment surrounding the autonomous vehicle. The fusion system is configured to modify, based on the geographic prior data, the LIDAR point cloud data representing a three-dimensional view of the environment into map-modified LIDAR data having a plurality of layers, each layer representing a two-dimensional view of the environment. The fusion system is also configured to fuse image features from the image data with LIDAR features from the map-modified LIDAR data, and to generate a feature map comprising the fused image features and the LIDAR features. The detector system is configured to detect, based on the feature map, three-dimensional objects of interest within the environment.

Another example aspect of the present disclosure is directed to a computer-implemented method. The computer-implemented method includes obtaining, by a computing system comprising one or more computing devices, image data associated with an environment surrounding an autonomous vehicle. The computer-implemented method also includes obtaining, by the computing system, LIDAR point cloud data associated with the environment surrounding the autonomous vehicle. The computer-implemented method includes projecting, by the computing system, the LIDAR point cloud data to a bird's eye view representation of the LIDAR point cloud data. The computer-implemented method also includes obtaining, by the computing system, geographic prior data regarding the environment surrounding the autonomous vehicle. The computer-implemented method also includes modifying, by the computing system, based on the geographic prior data, the bird's eye view representation of the LIDAR point cloud data into map-modified LIDAR data having a plurality of layers, each layer representing a two-dimensional view of the environment. The computer-implemented method also includes fusing, by the computing system, image features from the image data with LIDAR features from the map-modified LIDAR data. The computer-implemented method also includes generating, by the computing system, a feature map comprising the fused image features and LIDAR features. The computer-implemented method also includes detecting, by the computing system, based on the feature map, three-dimensional objects of interest within the environment.

Another example aspect of the present disclosure is directed to an autonomous vehicle that includes a camera system, a LIDAR system, a map system, a fusion system, a detector system, a motion planning system, and a vehicle control system. The camera system is configured to capture image data associated with an environment surrounding an autonomous vehicle. The LIDAR system is configured to capture LIDAR point cloud data associated with the environment surrounding the autonomous vehicle. The map system is configured to provide geographic prior data regarding the environment surrounding the autonomous vehicle. The fusion system is configured to modify, based on the geographic prior data, the LIDAR point cloud data into map-modified LIDAR data having a plurality of layers, each layer representing a two-dimensional view of the environment. The fusion system is also configured to fuse image features from the image data with LIDAR features from the map-modified LIDAR data, and to generate a feature map comprising the fused image features and the LIDAR features. The detector system is configured to detect three-dimensional objects of interest within the feature map. The motion planning system is configured to determine a motion plan for the autonomous vehicle based at least in part on the detected three-dimensional objects of interest. The vehicle control system is configured to control the autonomous vehicle to implement the motion plan.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
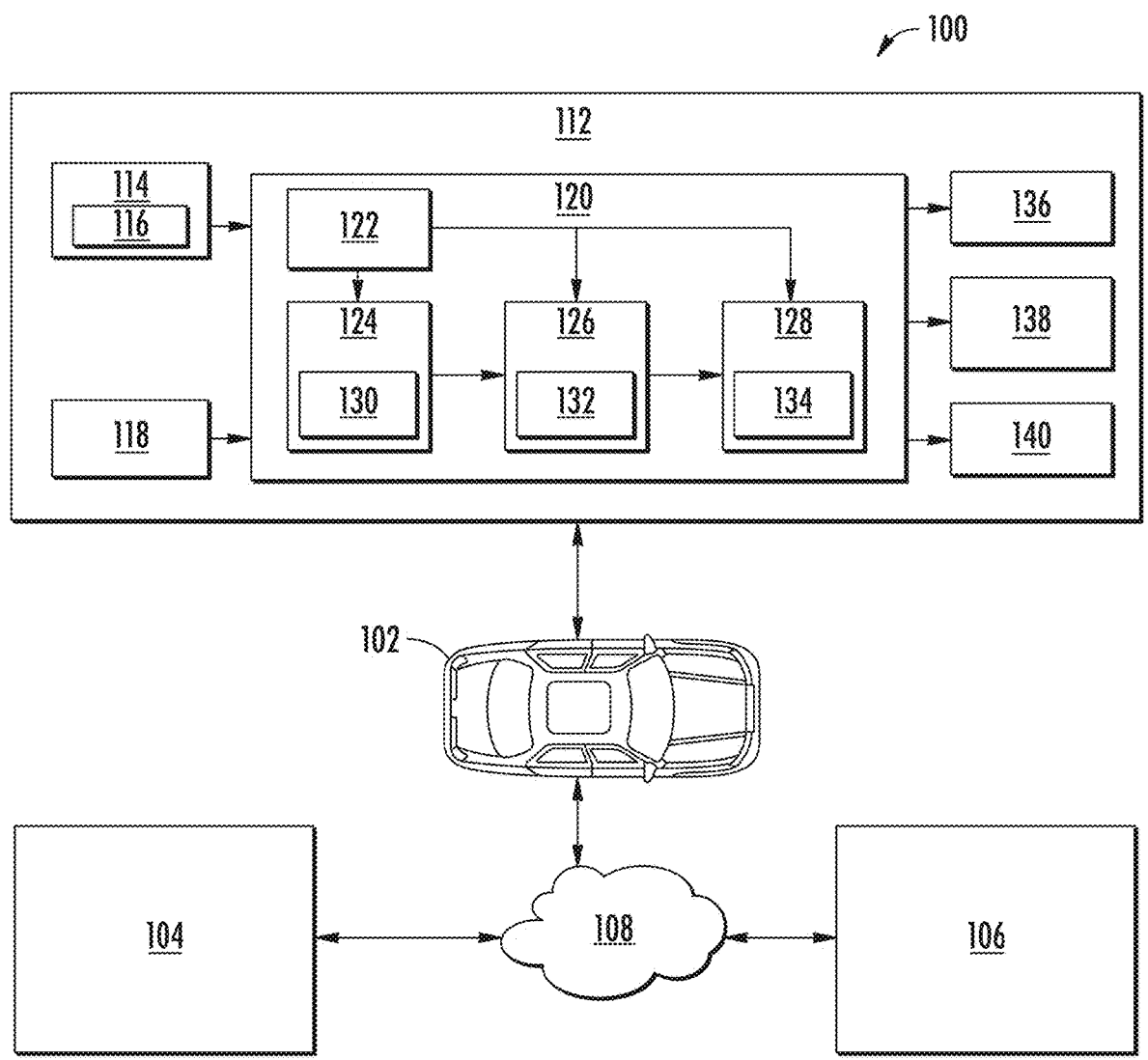
FIG. 1 depicts a block diagram of an example system for controlling the navigation of a vehicle according to example embodiments of the present disclosure.

Generally, the present disclosure is directed to systems and methods that implement improved detection of objects in three-dimensional (3D) space. More particularly, an improved 3D object detection system can exploit continuous fusion of multiple sensors and/or integrated geographic prior map data to enhance effectiveness and robustness of object detection in applications such as autonomous driving. In some implementations, geographic prior data can be exploited to enhance three-dimensional object detection for autonomous vehicle applications. Geographic prior data can correspond, for example, to predetermined map data descriptive of available geographic information regarding a particular area, such as might be available in a pre-existing high-definition (HD) maps database. In particular, geographic prior data (e.g., geometric ground and/or semantic road features) either obtained from HD maps or estimated for an environment surrounding an autonomous vehicle can be systematically incorporated into sensor data (e.g., LIDAR data) to generate an improved map-aware object detection system. In some implementations, object detection systems and methods can be improved based on dynamic utilization of multiple sensor modalities. More particularly, an improved 3D object detection system can exploit both LIDAR systems and cameras to perform very accurate localization of objects within three-dimensional space relative to an autonomous vehicle. For example, multi-sensor fusion can be implemented via continuous convolutions to fuse image data samples and LIDAR feature maps at different levels of resolution. By utilizing one or more of the disclosed techniques, object detection for autonomous driving applications can be improved in a manner that yields more accurate and robust detection performance, thus yielding improved motion planning and navigation for autonomous vehicles.

More particularly, in some implementations, 3D object detection can be determined for a variety of different types of applications. In some implementations, 3D object detection can be determined for a ground-based vehicle (e.g., an automobile), an aircraft, and/or another type of vehicle. In some implementations, the vehicle can be an autonomous vehicle that can perform various actions including driving, navigating, and/or operating, with minimal and/or no interaction from a human driver. The autonomous vehicle can be configured to operate in one or more modes including, for example, a fully autonomous operational mode, a semi-autonomous operational mode, a park mode, and/or a sleep mode. A fully autonomous (e.g., self-driving) operational mode can be one in which the vehicle can provide driving and navigational operation with minimal and/or no interaction from a human driver present in the vehicle. A semi-autonomous operational mode can be one in which the vehicle can operate with some interaction from a human driver present in the vehicle. Park and/or sleep modes can be used between operational modes while the vehicle performs various actions including waiting to provide a subsequent vehicle service, and/or recharging between operational modes.

More particularly, in some implementations, a computing system associated with a vehicle (e.g., an autonomous vehicle) can receive sensor data from one or more sensors that generate sensor data relative to the autonomous vehicle. In order to autonomously navigate, the autonomous vehicle can include a plurality of sensors (e.g., a LIDAR system, a RADAR system, cameras, etc.) configured to obtain sensor data associated with the autonomous vehicle's surrounding environment as well as the position and movement of the autonomous vehicle. In some implementations, the sensor data can include image data obtained from one or more cameras. In some implementations, the sensor data can include LIDAR data obtained from a LIDAR system. For example, a LIDAR system can be configured to capture LIDAR data (e.g., 3D LIDAR point cloud data associated with an environment surrounding an autonomous vehicle). In some implementations, the sensor data can include image data obtained from one or more cameras. In some implementations, the sensor data can include a bird's eye view representation of data (e.g., LIDAR data) obtained relative to the autonomous vehicle. In some implementations, the computing system can project the LIDAR point cloud data obtained from the LIDAR system to a bird's eye view representation of the LIDAR point cloud data.

More particularly, in some implementations, a computing system associated with an autonomous vehicle can access or otherwise obtain map data indicative of the surrounding geographic environment of an autonomous vehicle. For example, map data can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the map data can be provided in a bird's eye view representation. In some implementations, such a bird's eye view representation of the map data can be generated by rasterization or other suitable processing format.

In some implementations, the map data can be high-definition map data including geographic prior data that is obtained from a map system. The geographic prior data can represent previously observed geographic data associated with the geographic environment in which an autonomous vehicle is configured to operate. For example, the geographic prior data can include geometric ground prior data, semantic road prior data, and the like. When real-time location sensors within the autonomous vehicle determine a current geographic location of the autonomous vehicle, geographic prior data (e.g., geometric ground prior data and/or semantic road prior data) associated with that current geographic location can be retrieved from the map system.

In some implementations, such as but not limited to situations in which the high-definition map data is unavailable from the map system, at least a portion of map data (e.g., a representation of the geographic prior data) can be estimated by a map estimation system. For example, a map estimation system can generate estimated geographic prior data including a bird's eye view representation of estimated geometric ground prior data and/or estimated semantic road prior data.

More particularly, in some implementations, the map estimation system can be a machine-learned map estimation model comprising a first component (e.g., a first neural network) dedicated to determining the bird's eye view representation of estimated geometric ground prior data and a second component (e.g., a second neural network) dedicated to determining the bird's eye view representation of estimated semantic road prior data. The machine-learned map estimation model (and/or the first and second components thereof) can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

In some implementations, a computing system associated with an autonomous vehicle can include a fusion system (e.g., a map fusion system) that is configured to modify sensor data from a sensor system (e.g., LIDAR point cloud data representing a three-dimensional view of the environment) based on geographic prior data from a map system, resulting in map-modified sensor data (e.g., map-modified LIDAR data). More particularly, in some implementations, the fusion system can be configured to modify a bird's eye view representation of LIDAR point cloud data based on geometric ground prior data. For example, a bird's eye view representation of LIDAR point cloud data can be modified based on geometric ground prior data by subtracting ground information associated with the geometric ground prior data from the LIDAR point cloud data. The resulting map-modified LIDAR data can have a plurality of layers, each layer representing a two-dimensional view of the environment.

In some implementations, a fusion system can be configured to modify sensor data (e.g., a discretized representation of LIDAR point cloud data) based on semantic road prior data. A discretized representation of LIDAR point cloud data can be generated, for example, by determining binary occupancy feature maps from the LIDAR point cloud data, determining an intensity feature map from the LIDAR point cloud data, and generating a LIDAR three-dimensional grid with occupancy and intensity features based on the binary occupancy feature maps and the intensity feature map. The fusion system can be configured to modify the discretized representation of the LIDAR point cloud data based on the semantic road prior data by extracting a semantic road region mask from a high definition map and rasterizing the semantic road region mask onto the LIDAR point cloud data as a binary road mask channel. In some implementations, the computing system can be further configured to concatenate the binary road mask channel with the LIDAR three-dimensional grid along a z-axis.

In some implementations, a fusion system can also be configured to fuse image data samples and LIDAR feature maps at different levels of resolution. For example, a fusion system can include a machine-learned neural network configured to implement continuous convolutions for multi-sensor fusion. In some implementations, the machine-learned neural network can include one or more fusion layers that are configured to fuse image features from image data (e.g., image data captured by a camera system within an autonomous vehicle) with LIDAR features from LIDAR point cloud data (e.g., LIDAR point cloud data captured by a LIDAR system within an autonomous vehicle). In some implementations, the fusion layer(s) can be configured to fuse image features from image data at a first level of resolution with LIDAR features from the LIDAR point cloud data at a second level of resolution that is different from the first level of resolution. In some implementations, the image data has a higher level of resolution than the LIDAR point cloud data (which can be captured at a fewer number of data points compared with the image data). However, the implementation of the fusion system is such that the fusing of features reduces potential resolution loss relative to the original sensor data streams.

In some implementations, the computing system associated with the autonomous vehicle can be configured to generate first and second respective data streams associated with first and second sensor modalities. For example, the computing system can be configured to generate a first data stream descriptive of image data and a second data stream descriptive of LIDAR point cloud data. The computing system can be further configured to execute at the machine-learned neural network, one or more continuous convolutions to fuse the image features from the first data stream with the LIDAR features from the second data stream. The computing system can also be configured to generate a feature map that includes the fused image features and LIDAR features. In some implementations, the feature map is configured as a bird's eye view representation for subsequent analysis, which can advantageously maintain a data structure native to the 3D sensors such as LIDAR and facilitate training of machine-learned models employed in the corresponding fusion system.

More particularly, in some implementations executing one or more continuous convolutions at the machine-learned neural network of the fusion system can include receiving a target data point associated with the image data, extracting a plurality of source data points associated with the LIDAR point cloud data based on a distance of each source data point to the target data point, and fusing information from the plurality of source data points in the one or more fusion layers to generate an output feature at the target data point. In some implementations, extracting a plurality of source data points associated with the LIDAR point cloud data includes using a K nearest neighbors (KNN) pooling technique.

More particularly, in some implementations, the one or more fusion layers of the machine-learned neural network of the fusion system can include one or more multi-layer perceptrons each having a first portion and a second portion. The first portion of each multi-layer perceptron can be configured to extract the plurality of source data points associated with the LIDAR point cloud data given the target data point associated with the image data. The second portion of each multi-layer perceptron can be configured to encode an offset between each of the source data points associated with the LIDAR point cloud data and the target data point associated with the image data. In some implementations, the offset between each of the source data points associated with the LIDAR point cloud data and the target data point associated with the image data can be a subpixel offset between a continuous coordinate associated with each source data point and a discrete location of the target data point when projected onto an image plane. In some implementations, the offset can additionally or alternatively be a three-dimensional offset between each of the source data points and the target data point.

More particularly, in some implementations, fusing information from the plurality of source data points in the one or more fusion layers to generate an output feature at the target data point can include concatenating a plurality of LIDAR features associated with the LIDAR point cloud data at the plurality of source data points.

More particularly, in some implementations, extracting with the machine-learned neural network a plurality of source data points associated with the LIDAR point cloud data can include generating a mapping between the a target domain associated with the image data and a source domain associated with the LIDAR point cloud data based on a calibration of the camera system and the LIDAR system.

In some implementations, a computing system associated with an autonomous vehicle can additionally include a detector system configured to receive the map-modified sensor data (e.g., map-modified LIDAR data) and to detect, based on the map-modified sensor data, three-dimensional objects of interest within the environment surrounding the autonomous vehicle. For example, the detection system can include a machine-learned detector model configured to receive the map-modified LIDAR data as input and, in response to receiving the map-modified LIDAR data, to generate as output a plurality of detections corresponding to identified objects of interest within the environment, based on the map-modified LIDAR data. In some implementations, the plurality of detections can include a plurality of bounding shapes at locations within the map-modified LIDAR data having a confidence score associated with object likelihood that is above a threshold value. In some implementations, the machine-learned detector model can be trained by applying map data dropout such that the machine-learned detector model is robust to the availability of the geographic prior data.

The machine-learned detector model as described herein can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

According to another aspect of the present disclosure, a computing system associated with an autonomous vehicle can implement additional autonomy processing functionality based on the output of the machine-learned detector model. For example, a motion planning system can determine a motion plan for the autonomous vehicle based at least in part on the detection output(s) and forecasting output(s). Stated differently, given information about the current locations of objects and/or predicted future locations and/or moving paths of proximate objects, the motion planning system can determine a motion plan for the autonomous vehicle that best navigates the autonomous vehicle along a determined travel route relative to the objects at such locations.

As one example, in some implementations, the motion planning system can determine a cost function for each of one or more candidate motion plans for the autonomous vehicle based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations and/or moving paths of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle control system that controls one or more vehicle controls (e.g., actuators or other devices that control gas flow, steering, braking, etc.) to execute the selected motion plan.

Various means can be configured to perform the methods and processes described herein. For example, an object detection computing system can include one or more of LIDAR data obtaining unit(s), LIDAR data projection unit(s), map data obtaining unit(s), map fusion unit(s), image data obtaining unit(s), sensor fusion unit(s), object detection unit(s), motion planning unit(s), vehicle controlling unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain LIDAR point cloud data associated with an environment surrounding an autonomous vehicle. The means can be configured to project the LIDAR point cloud data to a bird's eye view representation of the LIDAR point cloud data. The means can be configured to obtain geographic prior data regarding the environment surrounding the autonomous vehicle. The means can be configured to modify the bird's eye view representation of the LIDAR point cloud data based on the geographic prior data resulting in map-modified LIDAR data. The means can be configured to detect three-dimensional objects of interest within the map-modified LIDAR data.

More particularly, in some implementations, the means can be configured to modify the bird's eye view representation of the LIDAR point cloud data based on the geographic prior data includes subtracting ground information associated with the geometric ground prior data from the bird's eye view representation of the LIDAR point cloud data. The means can be configured to discretize the bird's eye view representation of the LIDAR point cloud data. The means can be configured to modify the discretized bird's eye view representation of the LIDAR point cloud data based on the semantic road prior data. The means can be configured to determine binary occupancy feature maps from the bird's eye view representation of the LIDAR point cloud data. The means can be configured to determine an intensity feature map from the bird's eye view representation of the LIDAR point cloud data. The means can be configured to generate a LIDAR three-dimensional grid with occupancy and intensity features based on the binary occupancy feature maps and the intensity feature map. The means can be configured to extract a semantic road region mask from a high definition map. The means can be configured to rasterize the semantic road region mask onto the bird's eye view representation of the LIDAR point cloud data as a binary road mask channel. The means can be configured to concatenate the binary road mask channel with the LIDAR three-dimensional grid along a z-axis. The means can be configured to generate estimated geographic prior data regarding the environment surrounding the autonomous vehicle, wherein the estimated geographic prior data includes a bird's eye view representation of one or more of estimated geometric ground prior data or estimated semantic road prior data.

In some implementations, the means can be additionally or alternatively configured to implement continuous convolutions for multi-sensor fusion via a machine-learned neural network or other suitable means. For example, the means can be configured to generate first and second respective data streams associated with first and second sensor modalities. For example, the means can be configured to generate a first data stream descriptive of image data and a second data stream descriptive of LIDAR point cloud data. The means can be further configured to execute at the machine-learned neural network, one or more continuous convolutions to fuse the image features from the first data stream with the LIDAR features from the second data stream. The means can also be configured to generate a feature map that includes the fused image features and LIDAR features. In some implementations, the feature map can be configured as a bird's eye view representation for subsequent analysis, which can advantageously maintain a data structure native to the 3D sensors such as LIDAR and facilitate training of machine-learned models employed in the corresponding fusion system.

More particularly, in some implementations, the means can be configured to receive a target data point associated with the image data, extract a plurality of source data points associated with the LIDAR point cloud data based on a distance of each source data point to the target data point (e.g., using a KNN pooling technique), and fuse information from the plurality of source data points in the one or more fusion layers to generate an output feature at the target data point (e.g., by concatenating a plurality of LIDAR features associated with the LIDAR point cloud data at the plurality of source data points).

The systems and methods described herein may provide a number of technical effects and benefits. More particularly, the disclosed technology provides for improved detection of objects in three-dimensional space. Object detection and classification for autonomous vehicle applications can require a substantial amount of processing power and analytical precision to yield effective and accurate results. The disclosed technology employs object detection techniques that can provide substantial improvements to that end by employing continuous fusion of multiple sensors and/or integrated geographic prior map data. Object detection systems and method incorporating such technology can be improved in a manner that yields more accurate and robust detection performance, thus yielding improved motion planning and navigation for autonomous vehicles.

More particularly, technical effects and advantages can be achieved by exploiting geographic prior data to enhance three-dimensional object detection for autonomous vehicle applications. In particular, geographic prior data (e.g., geometric ground and/or semantic road features) either obtained from HD maps or estimated for an environment surrounding an autonomous vehicle can be systematically incorporated into sensor data (e.g., LIDAR data) to generate an improved map-aware object detection system.

Additional technical effects and advantages can be achieved by exploiting dynamic utilization of multiple sensor modalities. More particularly, an improved 3D object detection system can exploit both LIDAR systems and cameras to perform very accurate localization of objects within three-dimensional space relative to an autonomous vehicle. For example, multi-sensor fusion can be implemented via continuous convolutions to fuse image data samples and LIDAR feature maps at different levels of resolution. Because LIDAR point cloud data can sometimes be sparse and continuous, while cameras capture dense features at discrete states, fusing such sensor data is nontrivial. The disclosed deep fusion incorporating continuous convolutions offers a technical solution that reduces resolution loss relative to the original sensor data streams. In addition, the disclosed technology provides for generation of a dense feature map that better maintains a comprehensive level of sensor data for subsequent object detection and other data processing.

Additional technical effects and benefits can be achieved by implementing data transformations and object detection using a bird's eye view (BEV) representation of the data (e.g., sensor data, map data, etc.). BEV representations of sensor data can be more amenable to efficient inference using machine-learned detector models. In addition, BEV representations of sensor data can advantageously retain the metric space associated with raw sensor data (e.g., image data captured by cameras and/or LIDAR point cloud data captured by a LIDAR system).

Additional technical effects and advantages are achieved by utilizing machine-learned model(s) for one or more systems within an object detection system. For example, a machine-learned map estimation model can help determine geographic prior data when it may be unavailable from sources such as a high definition map database. Additionally or alternatively, a machine-learned neural network can be included within a fusion system for implementing continuous convolutions associated with deep sensor fusion. Additionally or alternatively, a machine-learned detector model can be included to perform object detection of map-modified sensor data and/or feature maps generated via deep sensor fusion techniques.

The utilization of one or more machine-learned models can yield more effective performance in comparison to other approaches including rules-based determination systems. In addition, machine-learned models incorporated within an object detection system can improve scalability and can greatly reduce the research time needed relative to development of hand-crafted rules. For example, for manually created (e.g., rules conceived and written by one or more people) object detection rules, a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the improved map estimation, deep sensor fusion, object detection, and other features disclosed herein lead to improved safety for passengers and/or cargo in autonomous vehicles and to pedestrians and other vehicles. Further, the disclosed technology can achieve improved fuel economy by requiring less sudden braking and other energy inefficient maneuvers caused by inaccurate or imprecise detection of objects within the environment surrounding an autonomous vehicle. Additionally, the disclosed technology can result in more efficient utilization of computational resources due to the improvements in processing data and implementing object detection that come through use of one or more of the disclosed techniques.

The disclosed technology can also improve the operational performance and safety of an autonomous vehicle by reducing the amount of wear and tear on vehicle components through more gradual braking based on earlier and more accurate detection of objects of interest. For example, more effective detection of objects of interest by the vehicle computing system can allow for a smoother ride that reduces the amount of strain on the vehicle's engine, braking, and/or steering systems, thereby improving vehicle performance and safety.

With reference now to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, a bike, a scooter and/or another type of vehicle or light electric vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
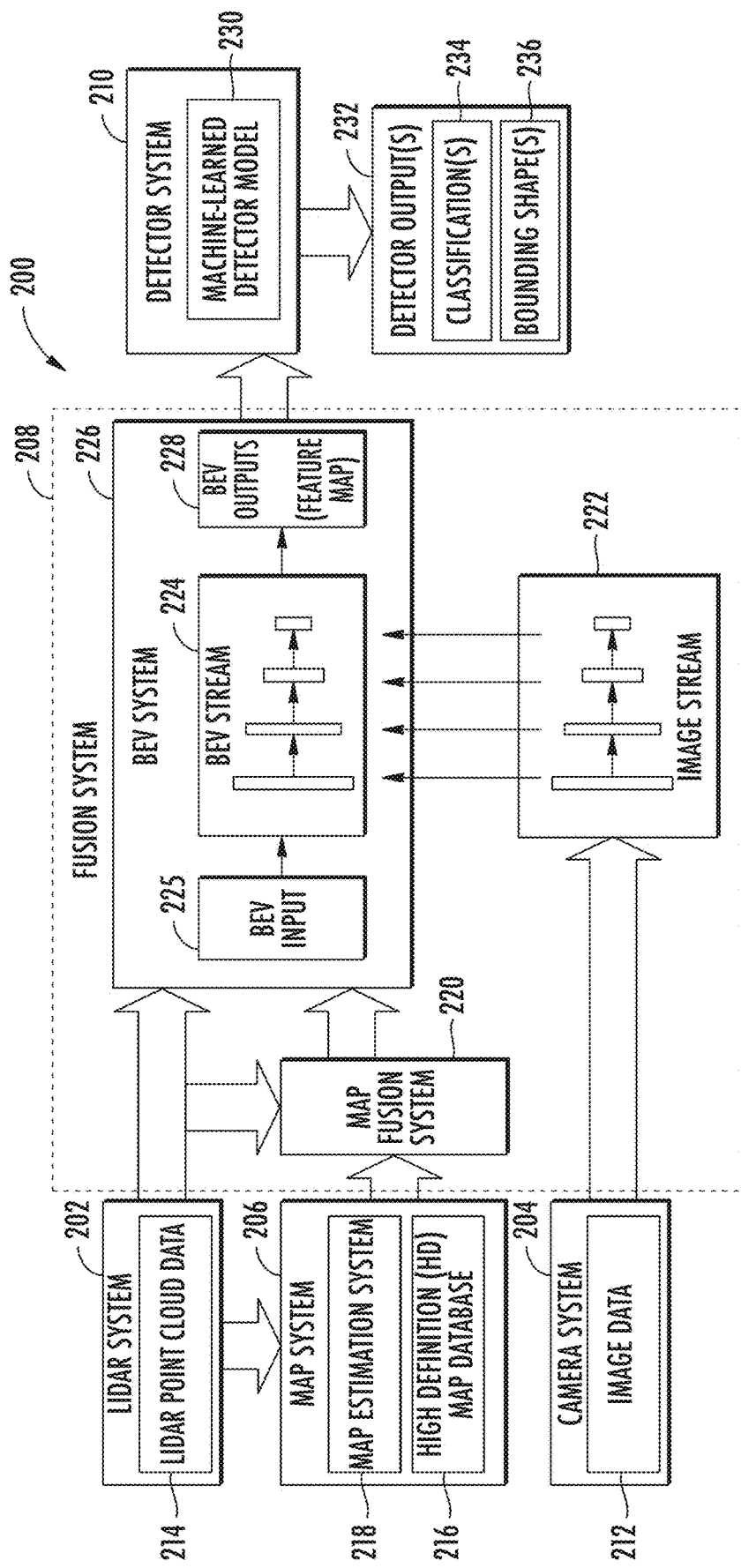
FIG. 2 depicts a block diagram of an example object detection system according to example embodiments of the present disclosure.

FIG. 2 depicts a block diagram of an example (3D) object detection system 200 according to example embodiments of the present disclosure. In some implementations, object detection system 200 can be implemented as part of a computing system such as but not limited to vehicle computing system 112 of FIG. 1. Object detection system 200 can include, for example, one or more sensor systems (e.g., LIDAR system 202 and camera system 204), map system 206, fusion system 208, and detector system 210.

With more particular reference to FIG. 2, object detection system 200 can be configured to receive sensor data from one or more sensors that generate sensor data relative to an autonomous vehicle associated with the object detection system 200. For example, the sensor data can include image data 212 obtained from one or more cameras in camera system 204. In some implementations, the sensor data can include LIDAR data obtained from a LIDAR system. For example, a LIDAR system 202 can be configured to capture LIDAR data (e.g., 3D LIDAR point cloud data 214 associated with an environment surrounding an autonomous vehicle). In some implementations, the LIDAR point cloud data 214 can include a bird's eye view representation of data (e.g., LIDAR data) obtained relative to the autonomous vehicle. In some implementations, object detection system 200 can project the LIDAR point cloud data 214 obtained from the LIDAR system 202 to a bird's eye view representation of the LIDAR point cloud data 214. In some implementations, LIDAR system 202 and camera system 204 of FIG. 2 are part of the autonomy system sensors 114 of FIG. 1, while image data 212 and LIDAR point cloud data 214 of FIG. 2 are part of the autonomy system sensor data 116 of FIG. 1.

Referring still to FIG. 2, object detection system 200 can access or otherwise obtain map data indicative of the surrounding geographic environment of an autonomous vehicle. In some implementations, the map data can be obtained from map system 206. In some implementations, map data determined by map system 206 includes high-definition map data such as obtained from a high-definition (HD) map database that includes geographic prior data. The geographic prior data stored in HD map database 216 can represent previously observed geographic data associated with the geographic environment in which an autonomous vehicle is configured to operate. For example, the geographic prior data stored in HD map database 216 can include geometric ground prior data, semantic road prior data, and the like. When real-time location sensors within the autonomous vehicle determine a current geographic location of the autonomous vehicle, geographic prior data (e.g., geometric ground prior data and/or semantic road prior data) associated with that current geographic location can be retrieved from the map system 206 (e.g., from HD map database 216).

In some implementations, map data obtained from map system 206 can correspond to a portion of map data 122 of FIG. 1. For example, map data from map system 206 (e.g., data stored in HD map database 216) can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the map data obtained from map system 206 can be provided in a bird's eye view representation. In some implementations, such a bird's eye view representation of the map data from map system 206 can be generated by rasterization or other suitable processing format.

Figure 3:
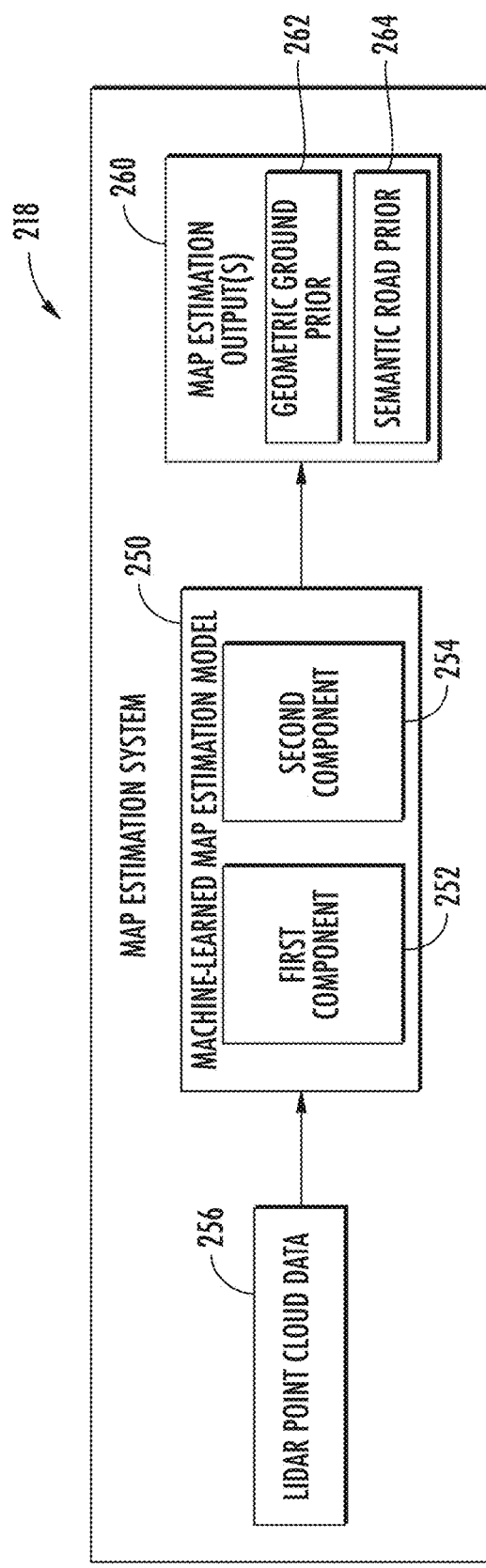
FIG. 3 depicts a graphical representation of an example map estimation system according to example embodiments of the present disclosure.

In some implementations, such as but not limited to situations in which the map data from HD map database 216 is unavailable from the map system, at least a portion of map data (e.g., a representation of the geographic prior data) can be determined by a map estimation system 218. For example, a map estimation system 218 can generate estimated geographic prior data including a bird's eye view representation of estimated geometric ground prior data and/or estimated semantic road prior data. A more particular example of map estimation system 218 is depicted in FIG. 3.

More particularly, in some implementations, the map estimation system 218 can include a machine-learned map estimation model 250 comprising a first component 252 (e.g., a first neural network) dedicated to determining the bird's eye view representation of estimated geometric ground prior data and a second component 254 (e.g., a second neural network) dedicated to determining the bird's eye view representation of estimated semantic road prior data. The machine-learned map estimation model 250 (and/ or the first and second components 252, 254 thereof) can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks. Map estimation system 218 can be trained using a set of map estimation training data and using one or more training techniques as described herein, including but not limited to training methods described with reference to FIGS. 16-17. In some implementations, map estimation system 218 is configured to provide LIDAR point cloud data 256 as input to machine-learned map estimation model 250. The machine-learned map estimation model 250 is configured to generate one or more map estimation outputs 260 in response to receipt of the LIDAR point cloud data 256 received as input. In some implementations LIDAR point cloud data 256 of FIG. 3 can correspond to the same LIDAR point cloud data 214 depicted in FIG. 2, or a portion of the autonomy system sensor data 116 of FIG. 1. The one or more map estimation outputs 260 can include, for example, geometric ground prior data 262 and/or semantic road prior data 264. In some implementations, the map estimation outputs including geometric ground prior data 262 and/or semantic road prior data 264 does not correspond to a dense 3D HD map such as might be available via HD map database 216 of FIG. 2, but only a bird's eye view of the suitable geographic prior data.

Referring again to FIG. 2, in some implementations, object detection system 200 associated with an autonomous vehicle (e.g., autonomous vehicle 102 of FIG. 1) can include a fusion system 208. Fusion system 208 (e.g., a portion thereof corresponding to map fusion system 220) can be configured to modify sensor data from a sensor system (e.g., LIDAR point cloud data 214) based on geographic prior data from map system 206, resulting in map-modified sensor data (e.g., map-modified LIDAR data). More particularly, in some implementations, the fusion system 208 (e.g., map fusion system 220) can be configured to modify a bird's eye view representation of LIDAR point cloud data 214 from LIDAR system 202 based on geometric ground prior data from map system 206. For example, a bird's eye view representation of LIDAR point cloud data 214 can be modified based on geometric ground prior data by subtracting ground information associated with the geometric ground prior data from the LIDAR point cloud data 214.

In some implementations, fusion system 208 (e.g., map fusion system 220) can be configured to modify sensor data (e.g., a discretized representation of LIDAR point cloud data) based on semantic road prior data. A discretized representation of LIDAR point cloud data can be generated, for example, by determining binary occupancy feature maps from the LIDAR point cloud data 214, determining an intensity feature map from the LIDAR point cloud data 214, and generating a LIDAR three-dimensional grid with occupancy and intensity features based on the binary occupancy feature maps and the intensity feature map. The fusion system 208 (e.g., map fusion system 220) can be configured to modify the discretized representation of the LIDAR point cloud data based on the semantic road prior data by extracting a semantic road region mask from a high definition map and rasterizing the semantic road region mask onto the LIDAR point cloud data as a binary road mask channel. In some implementations, the fusion system 208 (e.g., map fusion system 220) can be further configured to concatenate the binary road mask channel with the LIDAR three-dimensional grid along a z-axis. Additional details regarding map fusion system 220 are described herein with reference to FIGS. 5-8.

Referring still to FIG. 3, in some implementations, fusion system 208 can also be configured to fuse image data samples and LIDAR feature maps at different levels of resolution. For example, a fusion system 208 can include a machine-learned neural network configured to implement continuous convolutions for multi-sensor fusion, as more particularly depicted in FIG. 4. In some implementations, the machine-learned neural network can include one or more fusion layers that are configured to fuse image features from image data (e.g., image data 212 captured by a camera system 204 within an autonomous vehicle) with LIDAR features from LIDAR point cloud data (e.g., LIDAR point cloud data 214 captured by a LIDAR system 202 within an autonomous vehicle).

In some implementations, object detection system 200 can be configured to generate first and second respective data streams associated with first and second sensor modalities. For example, object detection system 200 can be configured to generate a first data stream descriptive of image data (e.g., image stream 222) and a second data stream descriptive of LIDAR point cloud data (e.g., bird's eye view (BEV) stream 224). In some implementations, BEV stream 224 can be determined from BEV input 225, which can correspond to either the LIDAR point cloud data 214 from LIDAR system 202 or map-modified LIDAR point cloud data from map fusion system 220. The fusion system 208 can be further configured to execute at a machine-learned neural network within BEV system 226, one or more continuous convolutions to fuse the image features from the first data stream (e.g., image stream 222) with the LIDAR features from the second data stream (e.g., BEV stream 224). The fusion system 208 can also be configured to generate a feature map 228 that includes the fused image features and LIDAR features. In some implementations, the feature map 228 is configured as a bird's eye view representation for subsequent analysis, which can advantageously maintain a data structure native to the 3D sensors such as LIDAR and facilitate training of machine-learned models employed in the corresponding fusion system 208.

In some implementations, object detection system 200 can additionally include a detector system 210 configured to receive the map-modified sensor data (e.g., map-modified LIDAR data from map fusion system 220) and/or the feature map 228 and to detect three-dimensional objects of interest within the map-modified LIDAR data and/or feature map. For example, the detector system 210 can include a machine-learned detector model 230 configured to receive the map-modified LIDAR data and/or feature map as input and, in response to receiving the map-modified LIDAR data, to generate as output a plurality of detector outputs 232. Detector outputs 232 can correspond to detections of identified objects of interest within the map-modified LIDAR data and/or feature map. In some implementations, the detector outputs 232 can include a plurality of classifications 234 classifying each detected object of interest as having a likelihood of corresponding to a particular class of object (e.g., vehicle, bicycle, pedestrian, other object, no object). In one example each classification 234 can include a confidence score associated with the probability that an object likelihood is above a threshold value. In some implementations, the detector outputs 232 can include a plurality of bounding shapes 236 at locations within the map-modified LIDAR data and/or feature maps.

In some implementations, the machine-learned detector model 230 can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks. The machine-learned detector model 230 can be trained using a set of detector training data and using one or more training techniques as described herein, including but not limited to training methods described with reference to FIGS. 16-17. In some implementations, the machine-learned detector model 230 can be trained by applying map data dropout such that the machine-learned detector model 230 is robust to the availability of the geographic prior data.

Referring again to FIGS. 1 and 2, a computing system (e.g., vehicle computing system 112 of FIG. 1) can be configured to receive the detector output(s) 232 from object detection system 200 of FIG. 2. For example, detector output(s) 232 can be provided to one or more of the perception system 124, prediction system 126, motion planning system 128, and vehicle control system 138 to implement additional autonomy processing functionality based on the detector output(s) 232. For example, motion planning system 128 of FIG. 1 can determine a motion plan for the autonomous vehicle (e.g., vehicle 102) based at least in part on the detection output(s) 232 of FIG. 2. Stated differently, given information about the current locations of objects detected via detector output(s) 232 and/or predicted future locations and/or moving paths of proximate objects detected via detector output(s) 232, the motion planning system 128 can determine a motion plan for the autonomous vehicle (e.g., vehicle 102) that best navigates the autonomous vehicle (e.g., vehicle 102) along a determined travel route relative to the objects at such locations. The motion planning system 128 then can provide the selected motion plan to a vehicle control system 138 that controls one or more vehicle controls (e.g., actuators or other devices that control gas flow, steering, braking, etc.) to execute the selected motion plan.

Figure 4:
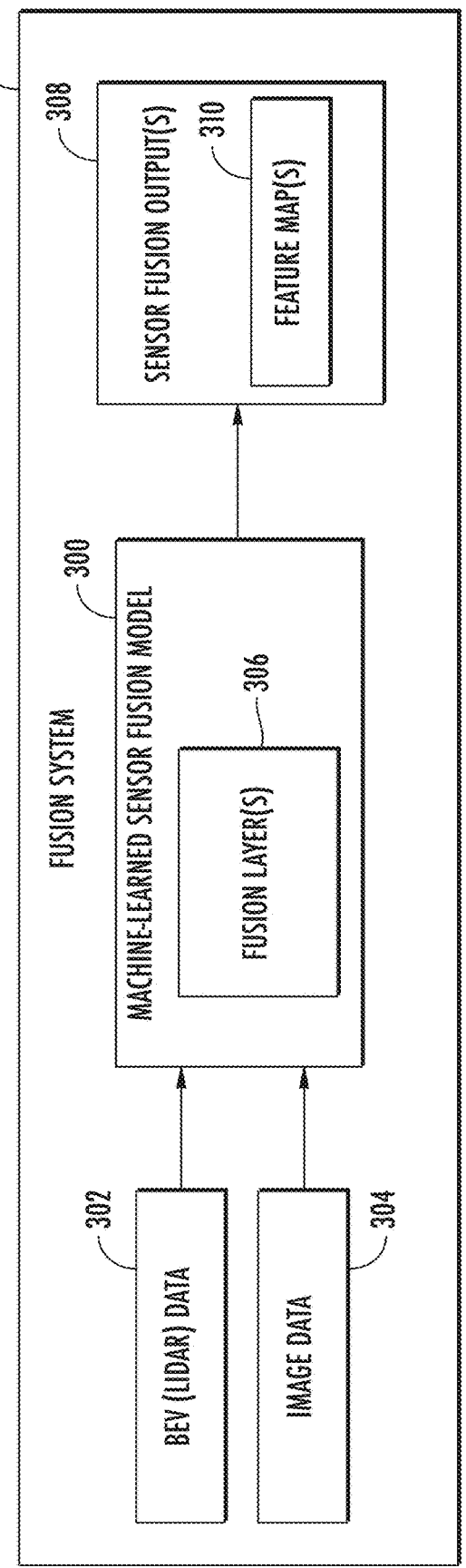
FIG. 4 depicts a graphical representation of an example fusion system according to example embodiments of the present disclosure.

FIG. 4 depicts a graphical representation of more particular aspects of an example fusion system (e.g., fusion system 208 of FIG. 2) according to example embodiments of the present disclosure.

In some implementations, fusion system 208 can more particularly include a machine-learned sensor fusion model 300 (e.g., one or more neural networks) configured to receive multiple sensor modality inputs. More particularly, the machine-learned sensor fusion model 300 can be configured to receive BEV (LIDAR) data 302 and image data 304. In some examples, the BEV LIDAR data 302 can correspond to the BEV input 225 of FIG. 2, corresponding to a bird's eye view representation of LIDAR point cloud data and/or map-modified LIDAR point cloud data from map fusion system 220.

In some implementations, the machine-learned sensor fusion model 300 can include one or more fusion layers 306 that are configured to fuse image features from image data (e.g., image data 304) with LIDAR features from LIDAR point cloud data (e.g., BEV LIDAR data 302). Machine-learned sensor fusion model 300 can be configured to execute one or more continuous convolutions to fuse image features from a first data stream associated with image data 304 with LIDAR features from a second data stream associated with BEV LIDAR data 302.

In some implementations, the one or more fusion layers 306 of the machine-learned sensor fusion model 300 can include one or more multi-layer perceptrons each having a first portion and a second portion. The first portion of each multi-layer perceptron can be configured to extract the plurality of source data points associated with the LIDAR point cloud data given the target data point associated with the image data. The second portion of each multi-layer perceptron can be configured to encode an offset between each of the source data points associated with the LIDAR point cloud data and the target data point associated with the image data. In some implementations, the offset between each of the source data points associated with the BEV LIDAR data 302 and the target data point associated with the image data 304 can be a subpixel offset between a continuous coordinate associated with each source data point and a discrete location of the target data point when projected onto an image plane. In some implementations, the offset can additionally or alternatively be a three-dimensional offset between each of the source data points and the target data point.

In some implementations, the machine-learned sensor fusion model 300 can correspond to one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks. The machine-learned sensor fusion model 300 can be trained using a set of sensor fusion training data and using one or more training techniques as described herein, including but not limited to training methods described with reference to FIGS. 16-17.

Referring still to FIG. 4, the machine-learned sensor fusion model 300 can be configured to generate, in response to receiving the BEV (LIDAR) data 302 and image data 304, one or more sensor fusion outputs 308. In some implementations, the sensor fusion outputs include one or more feature maps 310 that include the fused image features and LIDAR features. In some implementations, a feature map 310 is configured as a bird's eye view representation for subsequent analysis, which can advantageously maintain a data structure native to the 3D sensors such as LIDAR and facilitate training of machine-learned models employed in the corresponding fusion system.

FIGS. 5-8 describe various additional aspects associated with the object detection system 200 such as depicted in FIG. 2. More particularly, such figures depict specific aspects associated with a map system 206 and map fusion system 220 as depicted in FIG. 2.

With more particular reference to such figures, it should be appreciated that 3D object detectors in accordance with the disclosed technology exploit LiDAR as input as it provides good geometric cues and eases 3D localization when compared to systems that use cameras alone. Speed is a significant factor for autonomous driving, and therefore some examples of the disclosed technology set forth a single shot detector that operates on a bird's eye view representation of LIDAR data. Single shot detectors have been shown to be very promising when compared with proposal-based methods as they are very efficient and accurate. Bird's eye view is also a good representation for 3D LIDAR data because it's more amenable for efficient inference and also retains the metric space.

Some self-driving systems may have access to high-definition (HD) maps which contain geometric and semantic information about the environment. While HD maps may be used by known motion planning systems, they may not be used by known perception systems. The disclosed embodiments use HD maps along with strong priors to boost the performance and robustness of modern object detection. Towards this goal, some of the disclosed embodiments derive a single stage detector that operates on bird's eye view (BEV) and fuses LiDAR information with rasterized maps. Because HD maps might not be available everywhere, some of the disclosed embodiments utilize a map prediction module (e.g. map estimation system 218) that estimates a map geometry and semantics from a single online LIDAR sweep.

Results on a large scale 3D object detection benchmark show that up to 2.42% Average Precision (AP) gain can be achieved by exploiting HD maps. In situations where HD maps are not available, the map prediction module can provide up to 1.27% AP gain compared with a baseline. In the meantime, the proposed map-aware detector can run at 20 frames per second. A detailed ablation study on the model robustness to unavailable maps and how to incorporate different HD map information is also described herein.

Figure 5:
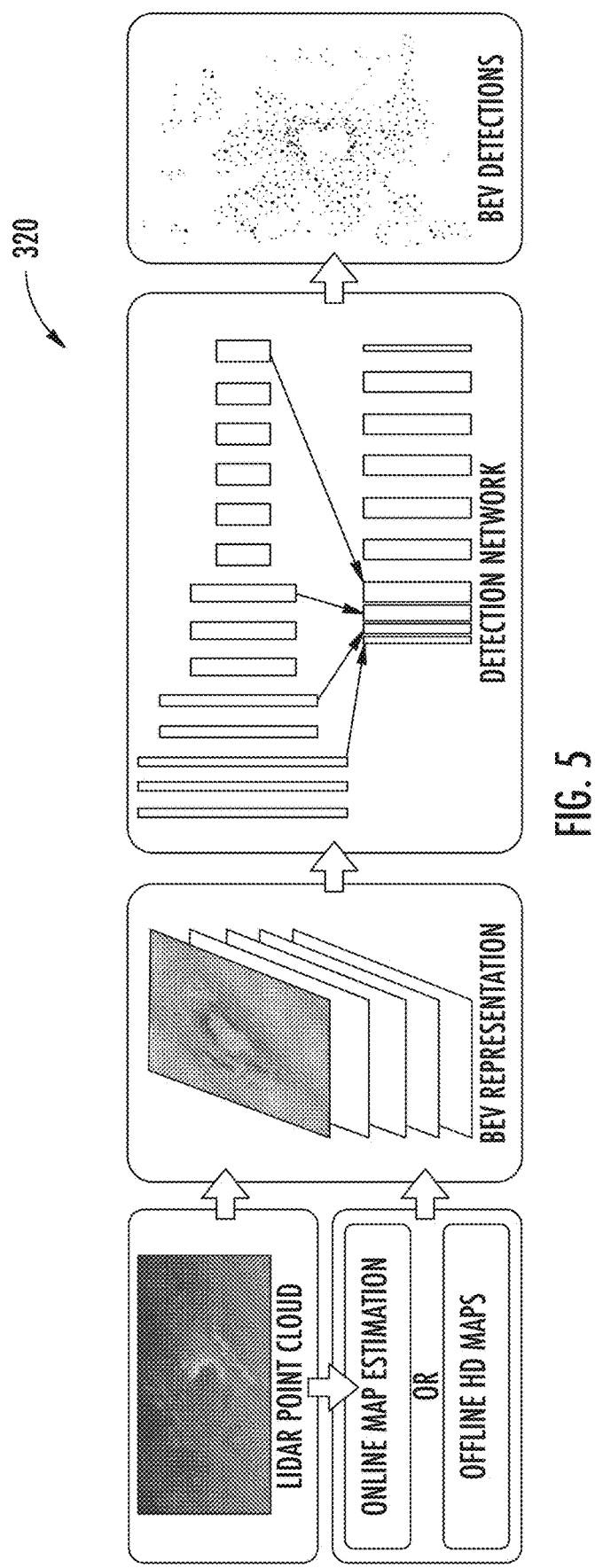
FIG. 5 depicts a graphical representation of an example map-based object detection system according to example embodiments of the present disclosure.
Figure 6A:
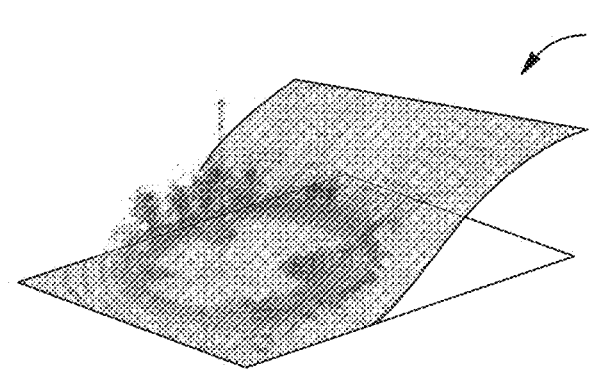
FIGS. 6A-6D depicts a graphical representation of an example input representation that exploits geometric and semantic HD map information according to example embodiments of the present disclosure.
Figure 6B:
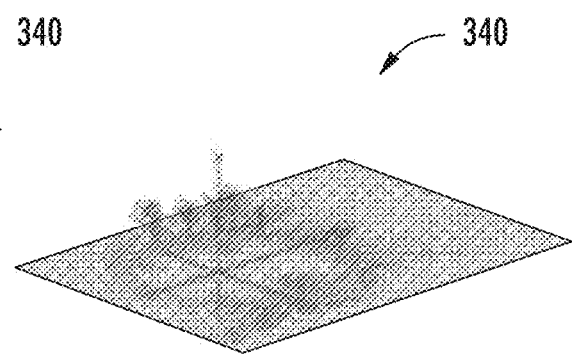
Figure 6C:
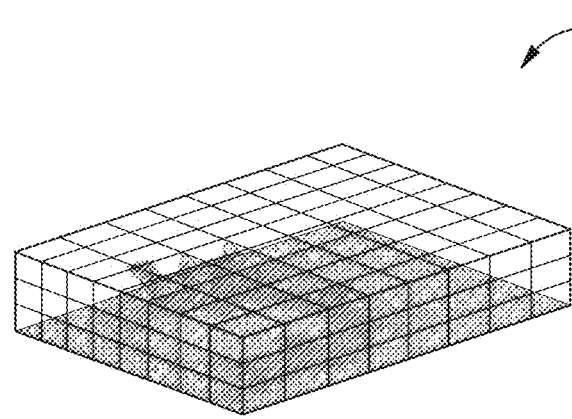
Figure 6D:
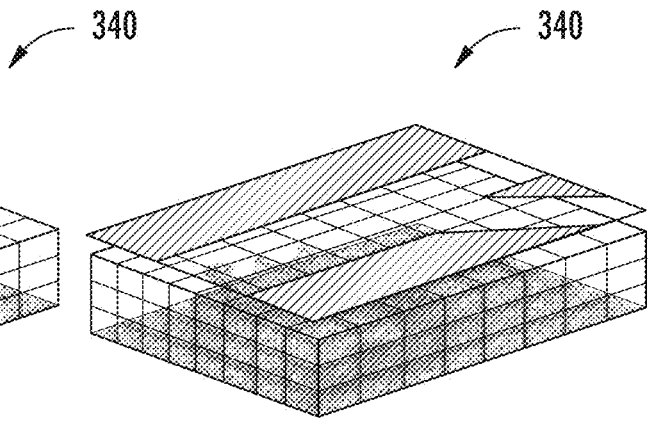

FIG. 5 shows an overall architecture 320 that may be implemented in at least some of the disclosed embodiments. The disclosed embodiments may be considered to apply both 3D object detection and HD maps by exploiting geometric and semantic priors from HD maps to boost the performance of 3D object detection. In some aspects, 3D object detection is achieved from point clouds.

With more particular reference to 3D object detection in point clouds, some detectors search objects in 3D space densely via sliding windows. Due to the sparsity of LIDAR point cloud, these approaches suffer from expensive computation. A more efficient representation of point cloud is 2D projections. Some solutions use a combination of range view projection and bird's eye view projection to fuse multi-view information. Some solutions use the bird's eye view representation alone and show superior performance in both speed and accuracy. Apart from grid-like representations, there are also works that learn feature representation from un-ordered point set for object detection. In addition to point cloud based detection, many works try to fuse data from multi-sensors for improved performance.

With more particular reference to exploiting priors from maps, maps contain geographic, geometric and semantic priors that are useful for many tasks. Some methods leverage dense priors from large-scale crowdsourced maps to build a holistic model that does joint 3D object detection, semantic segmentation and depth reconstruction. However, the priors are extracted by rendering a 3D world from the map, which can be very time-consuming. Crowd sourced maps are also used for fine-grained road segmentation. For 3D object detection specifically, the ground prior is often used. However, they treat ground as a plane and estimate it from raw LIDAR data, which is often inaccurate for slightly curved roads. In the disclosed embodiments, point-wise geometric ground prior as well as the semantic road prior for 3D object detection is used.

With more particular reference to exploiting HD maps for 3D object detection, HD maps are typically employed for motion planning but they are vastly ignored for perception systems. In embodiments of the disclosed technology, we disclose how HD maps can be used as priors for modern deep learning 3D object detection systems. Towards this goal, a single stage detector is developed that can exploit both semantic and geometric information extracted from the maps and LIDAR observations.

With more particular reference to an example input representation, LIDAR data can be projected to a bird's eye view (BEV) representation as this provides a compact representation that enables efficient inference. Note that this is a good representation for our application domain as vehicles drive on the ground. FIG. 6 illustrates how priors from HD maps can be incorporated into a BEV LIDAR representation.

FIG. 6 shows representations 340 that exploit geometric and semantic HD map information. Portion (a) of FIG. 6 depicts a raw LIDAR point cloud. Portion (b) of FIG. 6 depicts incorporation of geometric ground prior data into the LIDAR point cloud. Portion (c) of FIG. 6 depicts discretization of the LIDAR point cloud. Portion (d) of FIG. 6 depicts incorporating semantic road prior data.

Referring still to FIG. 6, in BEV representation, the Z axis can be treated as feature channels of 2D convolution. It can therefore be important to have more discriminant features along the Z axis. However, LIDAR point clouds often suffer from translation variance along the Z axis due to the slope of the road, and the variance becomes larger when farther regions are taken into account. For example, one (1) degree of road slope would lead to +1.22 meters variance in Z axis at 70 meters range. Additional challenges can arise because fewer observations are available at a longer range. To eliminate this translation variance, geometric ground information can be extracted from the HD maps. Specifically, given a LIDAR point cloud $(x_i, y_i, z_i)$, we query the point at location $(x_i, y_i)$ from the HD map, denoted as $(x_i, y_i, z_i^0)$. We then replace $z_i$ with $z_i^0$ so that the value is transformed into the distance to ground for each LIDAR point.

Given the modified LIDAR point cloud, it can then be discretized into a 3D grid with occupancy and LIDAR intensity features. Specifically, the 3D physical dimension L×W×H of the scene of interest can first be defined. Then binary occupancy feature maps can be computed at a resolution of $d_L \times d_W \times d_H$ and compute the intensity feature map at a resolution of $d_L \times d_W \times H$. A final representation can have a size of $$\frac{L}{d_L} \times \frac{W}{d_W} \times \left(\frac{H}{d_H} + 1\right).$$

A resultant LIDAR point cloud gives us a full scan of the surrounding environment, containing road, moving objects, and buildings. While in practice the moving objects on the road may have greater importance, the outside can be treated as non-drivable regions. Motivated by this, the semantic road region mask can be extracted from the HD map as a prior knowledge of the scene, which could potentially help guide the network to focus on important regions. Specifically, road layout information can be extracted from HD maps as polygon and rasterize it onto the bird's eye view as a binary road mask channel at the same resolution as the LIDAR 3D grid. The road mask channel can be concatenated together with the LIDAR 3D grid along the Z axis.

Figure 7:
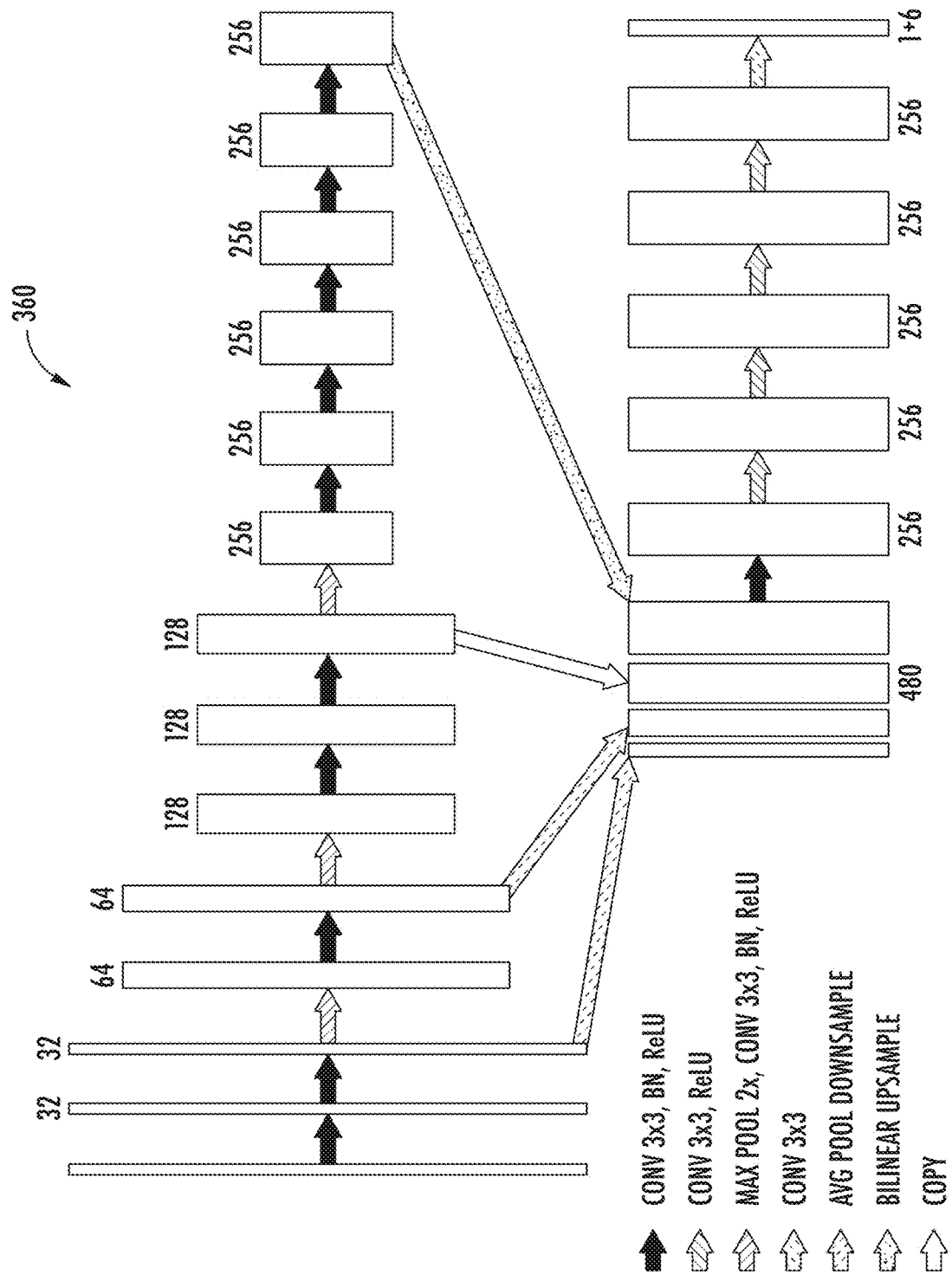
FIG. 7 depicts a graphical representation of layer details associated with an example machine-learned detector model according to example embodiments of the present disclosure.
Figure 8:
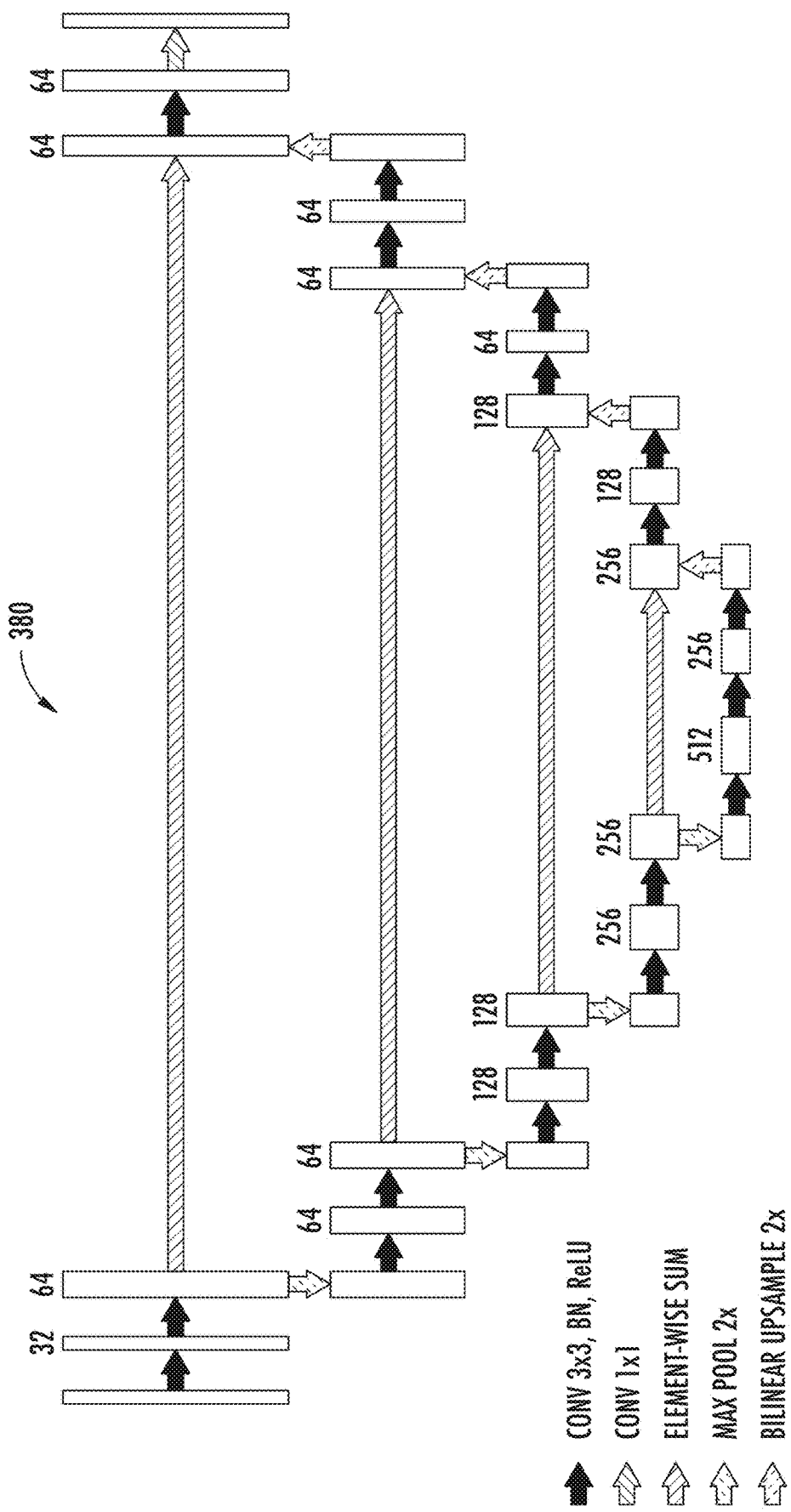
FIG. 8 depicts a graphical representation of layer details associated with an example machine-learned map estimation model according to example embodiments of the present disclosure.

With more particular reference to example network structures, an example network structure 360 for a machine-learned detector model such as machine-learned detector model 230 of FIG. 2 is depicted in FIG. 7, while an example network structure 380 for a machine-learned map estimation model such as machine-learned map estimation model 250 of FIG. 3 is depicted in FIG. 8.

Some of the disclosed embodiments use a fully convolutional network for single-stage dense object detection. An example network structure of some of these embodiments is illustrated in FIG. 7. The example network structure 360 of FIG. 7 is composed of two parts: a backbone network to extract scene-level features and a header network for detection outputs.

The backbone network may consist of four convolutional blocks, each having {2, 2, 3, 6} conv2D layers with filter number {32, 64, 128, 256}, filter size 3, and stride 1. Some embodiments apply batch normalization and ReLU function after each conv2D layer. After the first three convolutional blocks there may be a MaxPool layer with filter size 3 and stride 2. To combine high-level context with low-level details, some embodiments combine the output features from each convolutional block via re-sizing and channel concatenation. An additional conv2D layer may be applied to the multi-scale feature maps to reduce the channel dimension to 256. The total stride of the backbone network may be 4 in some aspects.

The header network is a multi-task network that tackles object classification and localization. It may consist of four conv2D layers with filter number 256, filter size 3 and stride 1, followed by the last conv2D layer that outputs final feature maps in two branches. One branch corresponds to a 1-d confidence score for object classification. The other branch may correspond to 6-d geometric representation of an object: $(\cos(2\theta), \sin(2\theta), dx, dy, \log w, \log l)$, where $\theta$ is the object heading angle in XY plane, $(dx, dy)$ is the position offset between the output pixel location and object center, and $(w, l)$ is the width and length of the object.

With the fully convolutional structure, some of the disclosed embodiments provide a network that outputs dense object detections. The advantages of dense object detection may be two-fold. First, it may be efficient to compute via convolution. Second, the upper bound recall rate of objects may be 100% both during training and inference stages.

With more particular reference to learning and inference, some embodiments of the disclosed detector networks can use a detector that works regardless of map availability. To this end, data dropout on the road mask channel can be employed in training, which can significantly improve the model's robustness to map priors.

In some aspects, multi-task loss may be used to train the detection network. Specifically, some aspects may use focal loss on the classification output and a smooth 4 loss on the regression output. The total loss can be calculated by summing over all positive samples. Some embodiments determine positive and negative samples by thresholding on the position offset to the nearest ground-truth box center. Some embodiments may also normalize the regression targets to have zero mean and unit variance before training.

In some implementations, during inference, locations with a confidence score above a certain threshold may be decoded into oriented bounding boxes. Non Maximum Suppression (NMS) may be applied with 0.1 Intersection Over Union (IoU) threshold to get the final detections.

With more particular reference to an example map estimation system (e.g., map estimation system of FIGS. 3 and 8), some embodiments may estimate the geometric ground prior and semantic road prior data online from a single LIDAR sweep when the HD maps are unavailable. It may not be necessary to estimate the dense 3D HD maps. Instead, predicting a bird's eye view representation of the geometric and semantic priors may be adequate. In this way, the estimated map features can be seamlessly integrated into a current framework.

With more particular reference to an example network structure of a map estimation system, some embodiments achieve map prediction by two separate neural networks that tackle ground estimation and road segmentation respectively. The network structure for these two tasks follows the same U-Net structure as shown in FIG. 8. This has the advantages of retaining low level details and output the same size feature map as the input.

With more particular reference to ground estimation, unlike other methods that treat the ground as a plane which is often inaccurate for long range detection, some of the disclosed embodiments predict ground height for locations on the BEV image. During training, these embodiments may use HD maps for ground truth labels, and only compute loss on locations where there is a LIDAR point in it. Empirical evidence indicates that ignoring empty locations during training leads to better performance.

With more particular reference to road segmentation, some embodiments predict pixel-wise BEV road segmentation as the estimated road prior. During training, some embodiments use the rasterized road region polygon as labels and compute the cross entropy loss summed over all locations.

Figure 9:
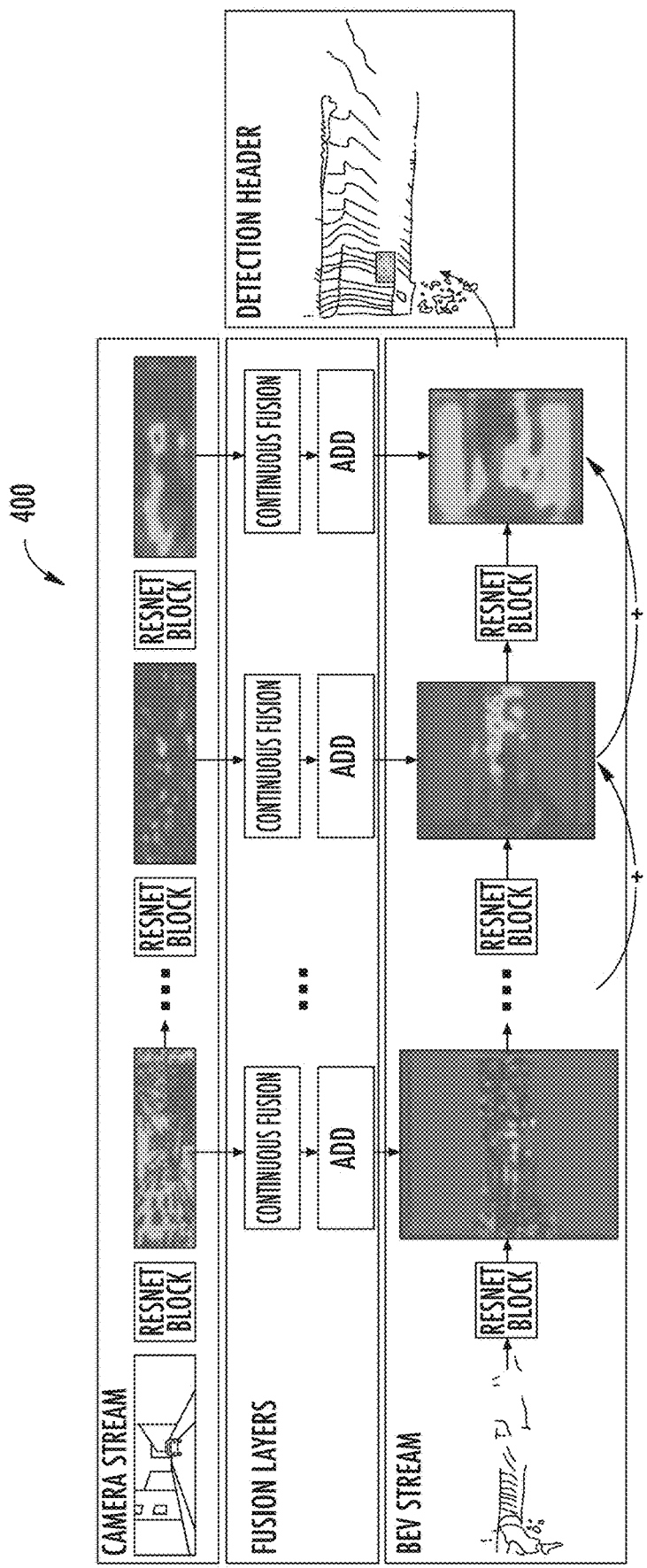
FIG. 9 depicts a graphical representation of a portion of a fusion system according to example embodiments of the present disclosure.
Figure 10:
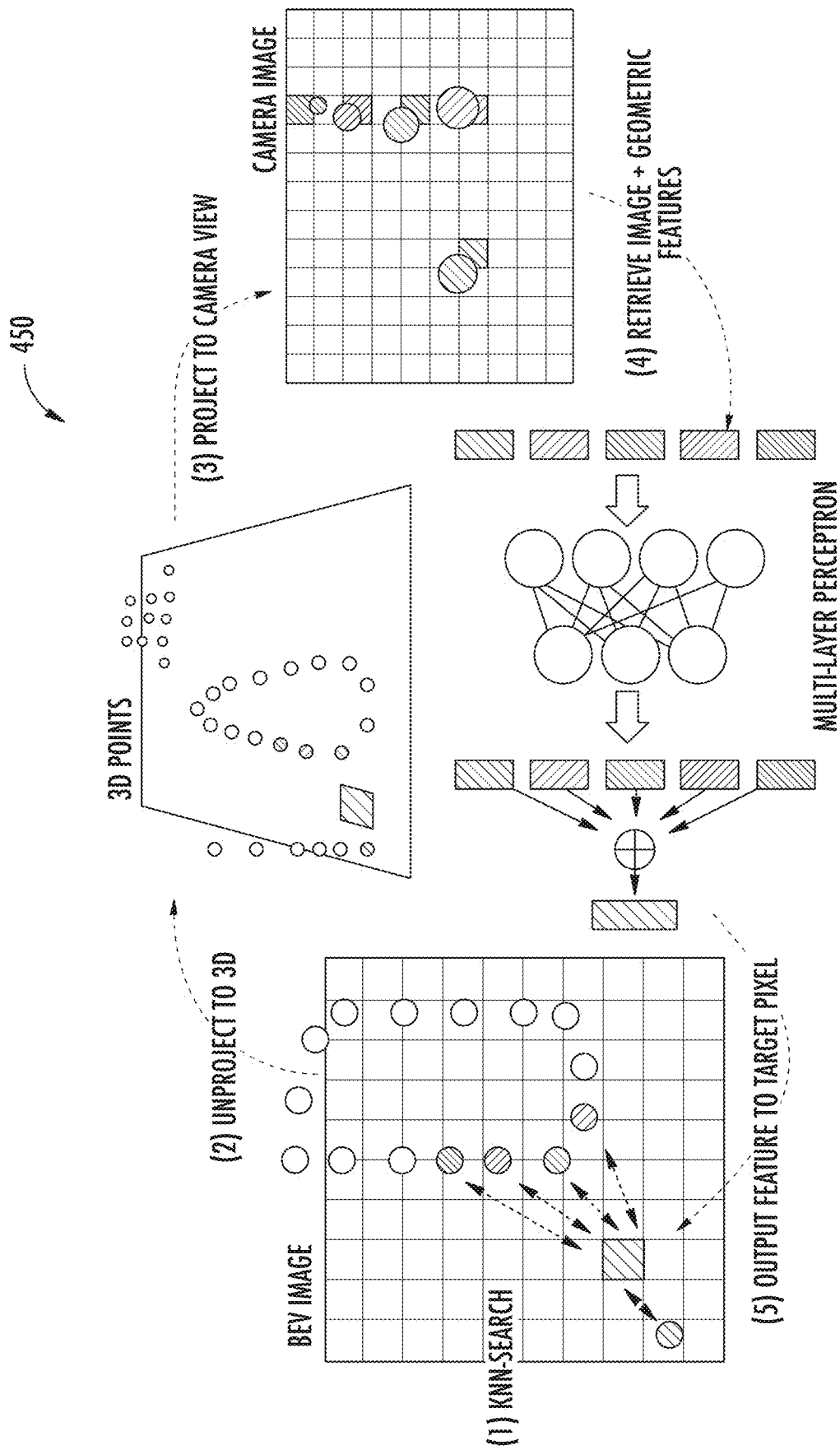
FIG. 10 depicts a graphical representation of a continuous fusion layer according to example embodiments of the present disclosure.

FIGS. 9-10 describe various additional aspects associated with the object detection system 200 such as depicted in FIG. 2. More particularly, such figures depict specific aspects associated with a fusion system 208 as depicted in FIG. 2.

An object detection system 200 can reason in bird's eye view and fuse image features by learning to project them into 3D space. Towards this goal, an end-to-end learnable architecture can be employed that exploits continuous convolutions to fuse image and LIDAR feature maps at different levels of resolution. The proposed continuous fusion layer is capable of encoding accurate geometric relationships between points under the two modalities without accuracy loss. This provides a novel, reliable and efficient 3D object detector based on multiple sensors that achieves significant improvements over the current state of the art.

FIG. 9 depicts a graphical representation of a portion of a fusion system according to example embodiments of the present disclosure. The overall architecture 400 of the graphical representation in FIG. 9 depicts a model that includes two streams, namely the camera image stream and the BEV image stream. Continuous fusion layers are used to fuse the image features onto overhear BEV feature maps.

In accordance with the disclosed technology, 3D object detection can be performed in bird's eye view (BEV). These detectors are effective as BEV maintains the structure native to 3D sensors such as LIDAR. As a consequence, convolutional neural nets can be easily trained and strong size priors can be exploited. Since most self-driving cars are equipped with both LIDAR and cameras, sensor fusion between these modalities is desirable in order to further boost performance. Fusing information between LIDAR and images is non-trivial as images represent a projection of the world into the camera plane, while LIDAR captures the world's native 3D structure. In accordance with the disclosed technology, image features are extracted by a convolutional network and then projected into BEV to fuse them with the convolution layers of a LIDAR based detector. This fusing operation is non-trivial, as image features happen at discrete locations, and thus one needs to "interpolate" to create a dense BEV feature map. To perform this operation, continuous convolutions are utilized to extract information from the nearest corresponding image features for each point in BEV space. Our overall architecture includes two streams, with one stream extracting image features and another one extracting features from LIDAR BEV. The continuous fusion layer can be configured to bridge multiple intermediate layers on both sides in order to perform multi-sensor fusion at multiple scales. This architecture facilitates generation of the final detection results in BEV space, as desired by many autonomous driving application domains. An illustration of the general architecture 400 that can used to accomplish a deep multi-sensor object detection system is provided in FIG. 9.

With more particular reference to deep parametric continuous convolutions, this is a learnable operator that operates over non-grid structured data. The motivation behind such operator is to extend the standard grid-structured convolution to non-grid data, while remaining high capacity and low complexity. The key idea is to exploit multi-layer perceptron as parameterized kernel functions for continuous convolution. This parametric kernel function spans the full continuous domain. Furthermore, the weighted sum over an infinite number of neighboring points is used to approximate the otherwise computationally prohibitive continuous convolution. Each neighbor is weighed differently according to its relative geometric offset with respect to the target point. To be more specific, parametric continuous convolution conducts the following operation:

$$h_i = \sum_j MLP(x_i - x_j) \cdot f_j$$

where j indexes over the neighbors of point i, $f_j$ is the input feature and $x_j$ is the continuous coordinate associated with a point. The advantage of parametric continuous convolution is that it utilizes the concept of standard convolution to capture local information from neighboring observations, without a rasterization stage which could bring geometric information loss. Continuous convolution is a good fit for the task of deep sensor fusion, due to the fact that both camera view and overhead view are connected through a 3D point set and modeling such geometric relationship between them in a lossless manner is key to fusing information.

FIG. 10 depicts an overall architecture 450 of a continuous fusion layer. Given a target pixel on BEV image, K nearest LIDAR points are extracted (step 1); we then project the 3D points onto a camera image plane (step 2-step 3); this helps retrieve corresponding image features (step 4); finally we send the image feature+continuous geometry offset into a MLP to generate output feature at the target pixel (step 5).

With more particular reference to the continuous fusion layer depicted in FIG. 10, the proposed continuous fusion layer exploits continuous convolutions to accomplish two aforementioned objectives, namely the sparsity in the observations as well as to handle the spatially-discrete features in camera view image. Given the input camera image feature map and a set of LIDAR points, the target of the continuous fusion layer is to create a dense BEV feature map based on the camera image such that its information could be fused together with BEV features extracted from LIDAR.

One difficulty of image-BEV fusion is that not all the discrete pixels on BEV space are observed in the camera. To overcome this, for each target pixel in the dense map, its nearest K LIDAR points are found over the 2D BEV plane using Euclidean distance. MLP can then be exploited to fuse information from such K nearest points to "interpolate" the unobserved feature at the target point. For each source LIDAR point, the input of our MLP contains three parts: First, we extract the corresponding image features by projecting the 3D points onto the image plane; Since there is a subpixel offset between each LIDAR point's continuous coordinate and the discrete pixel location when projected onto the image plane, this sub-pixel offset can be encoded as part of the input to avoid any loss of geometric information. The 3D offset between the source LIDAR point and target pixel can also be encoded, in order to implicitly model the importance of each LIDAR point according to its spatial proximity to target. Overall, this gives us a K×($D_i$+2+3)-dimensional input to the MLP for each target point, where $D_i$ is the input feature dimension. For each target pixel, the MLP outputs a $D_O$-dimensional output feature by summing over the MLP output for all its neighbors. That is to say:

$$h_i = \sum_j MLP(concat[f_j, y_j, x_j - x_i])$$

where $f_j$ is the input image feature of point j; $x_j-x_i$ is the 3D offset from neighbor point j to target i; $y_j$ is the subpixel offset when projected onto camera and concat(·) is the concatenation of multiple vectors. In practice, a 3-layer perceptron can be used where each layer has $D_i$ hidden features. The MLP output features are then summed over the BEV features from the previous layer to fuse multi-sensor information. The overall computation graph is shown in FIG. 10.

With more particular reference to a comparison of the disclosed continuous fusion approach relative to standard continuous convolutions, the proposed continuous fusion layer utilizes MLP to directly output target feature, instead of outputting weights to sum over features. This provides stronger capability and more flexibility to aggregate information from multiple neighbors. Another advantage is memory efficiency. Since the MLP directly outputs features rather than the weights, this approach does not need to explicitly store an additional weighting matrix in GPU memory. Moreover, the disclosed continuous fusion layer encode subpixel offsets as input to overcome the discrepancy between discrete feature map and continuous coordinate. This design choice is advantageous in terms of extracting information from spatial-discrete feature maps without losing information.

With more particular reference to an example multi-sensor detection network in accordance with the disclosed technology, one example network has two streams: the image feature network and the BEV network. Multiple (e.g., four) continuous fusion layers can be used to fuse multiple scales of image features into BEV network from lower level to higher levels. The overall architecture is depicted in FIG. 9, but the following description discusses each individual component in more detail.

One example aspect of the overall architecture 400 depicted in FIG. 9 corresponds to backbone networks. One example utilizes a light-weight ResNet18 as the backbone of the image network because of its efficiency, as in our application domain real-time estimates are a must for safety. The BEV network is customized to have five groups of residual blocks. The number of convolution layers per each group is 2, 4, 8, 12, 12, respectively. All groups start with a stride 2 convolution except for the first group, and all other convolutions have stride 1. The feature dimension of each group is 32, 64, 128, 192 and 256, respectively.

Another example aspect of the overall architecture 400 depicted in FIG. 9 corresponds to fusion layers. In one example, four continuous fusion layers are used to fuse multi-scale image features into the four residual groups of the BEV network. The input of each continuous fusion layer is an image feature map combined from the outputs of all four image residual groups. A combination approach similar to a feature pyramid network can be employed. The output feature in BEV space has the same shape as the corresponding BEV layer and combined into BEV through elementwise addition. A final BEV feature output also combines the last three residual groups output in order to exploit multi-scale information.

Another example aspect of overall architecture 400 depicted in FIG. 9 corresponds to detection header. A simple detection header can be used for real-time efficiency. A 1×1 convolutional layer is computed over the final BEV layer to generate the detection output. At each output location two anchors can be used which have fixed size and two orientations, 0 and π/2 radians respectively. Each anchor's output includes the per-pixel class confidence as well as its associated box's center location, size and orientation. A non-maximal suppression layer is followed to generate the final object boxes based on the output map.

A still further aspect of the overall architecture 400 depicted in FIG. 9 corresponds to training of the network. In some examples, a multi-task loss is used to train the network. A loss function can be defined as the sum of classification and regression losses.

$$L=L_{cls}+\alpha L_{reg}$$

where $L_{cls}$ and $L_{reg}$ are the classification loss and regression loss, respectively. $L_{cls}$ is defined as the binary cross entropy between class confidence and the label $$L_{cls} = \frac{1}{N}(l_c \log(p_c) + (1-l_c)\log(1-p_c))$$

where $p_c$ is the predicted classification score, $l_c$ is the binary label, and N is the number of samples. For 3D detection, $L_{reg}$ is the sum of seven terms $$L_{reg} = \frac{1}{N_{pos}} \sum_{k \in (x,y,z,w,h,d,t)} D(p_k, l_k)$$

where (x, y, z) denotes the 3D box center, (w, h, d) denotes the box size, t denotes the orientation, and $N_{pos}$ is the number of positive samples. D is smoothed L1-norm function defined as:

$$D(p_k, l_k) = \begin{cases} 0.5(p_k-l_k)^2 & \text{if } |p_k-l_k|<1 \\ |p_k-l_k|-0.5 & \text{otherwise,} \end{cases}$$

with $p_k$ and $l_k$ the predicted and ground truth offsets respectively. For k∈(x, y, z), $p_k$ is encoded as:

$$p_k=(k-a_k)/a_k$$

where $a_k$ is the coordinate of anchor. For k∈(w, h, d), $p_k$ is encoded as:

$$p_k=\log(k/a_k)$$

where $a_k$ is the size of anchor. The orientation offset is simply defined as the difference between predicted and labeled orientations:

$$p_t=k-a_k$$

When only BEV detections are required, z and d terms are removed from the regression loss. Positive and negative samples are determined based on distance to the ground-truth object centroid. Hard negative mining is used to sample the negatives. In particular, first random select 5% negative anchors and then only use top-k among them for training, based on the classification score. The image network can be initialized with ImageNet pretrained weights and initialize the BEV network and continuous fusion layers using Xavier initialization. The whole network is trained end-to-end through back-propagation. Note that there is no direct supervision on the image stream, instead, error is propagated along the bridge of continuous fusion layer from the BEV feature space.

Figure 11:
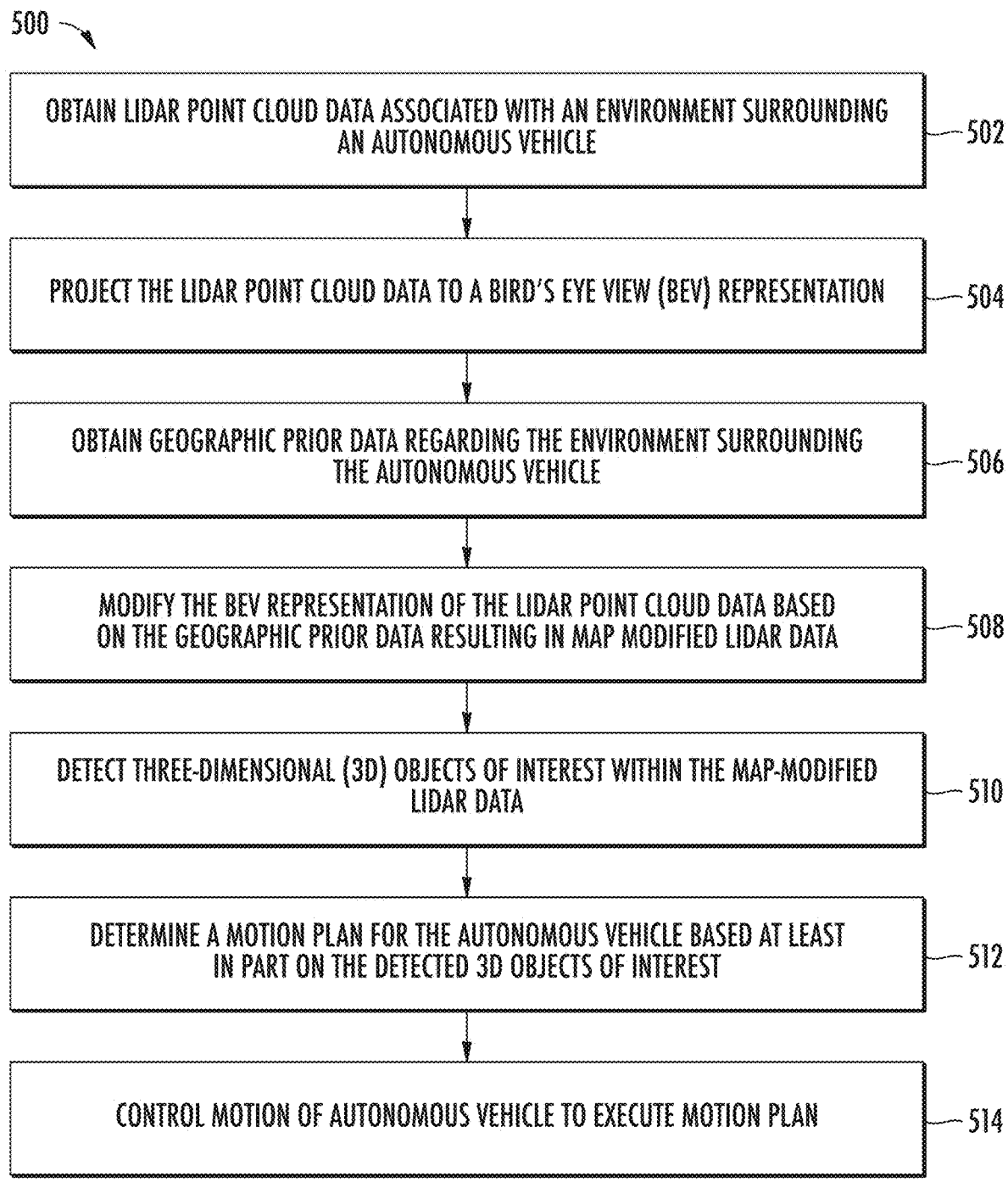
FIG. 11 depicts a flowchart diagram of a first example object detection method according to example embodiments of the present disclosure.

FIG. 11 depicts a flowchart diagram of a first example object detection method 500 according to example embodiments of the present disclosure. Method 500 can generally correspond to a method of object detection that exploits HD map fusion in accordance with the disclosed technology. One or more portion(s) of the method 500 can be implemented by one or more computing devices such as, for example, the computing device(s) within vehicle computing system 112 of FIG. 1, object detection system 200 of FIG. 2, or computing system 710 of FIG. 10. Moreover, one or more portion(s) of the method 500 can be implemented as an algorithm on the hardware components of the device(s) described herein to, for example, implement map fusion, object detection and associated motion planning for an autonomous vehicle.

Referring more particularly to FIG. 11, a computing system (e.g., object detection system 200 of FIG. 2 in conjunction with computing system 112 of FIG. 1) including one or more computing devices can implement one or more steps of method 500. At 502, method 500 can include obtaining/receiving LIDAR point cloud data associated with an environment surrounding an autonomous vehicle. In some implementations, the LIDAR point cloud data obtained at 502 can correspond to sensor data 116 of FIG. 1 and/or LIDAR point cloud data 214 of FIG. 2. In some implementations, the LIDAR point cloud data obtained at 502 can include a bird's eye view representation of LIDAR data obtained relative to an autonomous vehicle. In some implementations, at 504 the method 500 can include projecting the LIDAR point cloud data obtained at 502 to a bird's eye view representation.

At 506, method 500 can include obtaining/receiving map data associated with a surrounding geographic environment of the autonomous vehicle. In some implementations, the map data obtained at 506 can correspond to map data 122 of FIG. 1 and/or map data available via map system 206 of FIG. 2. In some implementations, the map data obtained at 506 can be a bird's eye view representation of a surrounding geographic environment of the autonomous vehicle in the form of geographic prior data. For example, the geographic prior data obtained at 506 can include geometric ground prior data and/or semantic road prior data.

In some implementations, obtaining/receiving geographic prior data at 506 can include obtaining/receiving geographic prior data from a high-definition (HD) map database (e.g., HD map database 216 of FIG. 2). In some implementations, such as when an HD maps database is inaccessible during real-time operations, obtaining/receiving geographic prior data at 506 can include obtaining/receiving geographic prior data from a map estimation system (e.g., map estimation system 218 of FIGS. 2-3). Such a map estimation system can be to generate estimated geographic prior data regarding the environment surrounding the autonomous vehicle when the geographic prior data from the map system is unavailable. In some implementations, obtaining estimated geographic prior data at 506 as generated by a map estimation system can include obtaining a bird's eye view representation of one or more of estimated geometric ground prior data or estimated semantic road prior data. In some implementations, a map estimation system configured to generate the geographic prior data obtained at 506 can include a machine-learned map estimation model. The machine-learned map estimation model can include a first component dedicated to determining the bird's eye view representation of the estimated geometric ground prior data and a second component dedicated to determining the bird's eye view representation of the estimated semantic road prior data.

At 508, method 500 can include modifying the LIDAR point cloud data obtained at 502 and/or projected into a bird's eye view representation at 504 based on the geographic prior data obtained at 506 resulting in map-modified LIDAR data. For example, in some implementations modifying the LIDAR point cloud data at 508 can include modifying a bird's eye view representation of the LIDAR point cloud data based on the geometric ground prior data (e.g., by subtracting ground information associated with the geometric ground prior data from the LIDAR point cloud data). In some implementations, modifying the LIDAR point cloud data at 508 can additionally or alternatively include modifying a discretized representation of the LIDAR point cloud data based on the semantic road prior data. More particular details regarding the map fusion process at 508 is depicted in and discussed with reference to FIG. 12. In some implementations, modifying the LIDAR point cloud data based on the geographic prior data to determine map-modified LIDAR data at 508 can be implemented by fusion system 208 (e.g., more particularly, by map fusion system 220).

At 510, method 500 can include detecting three-dimensional objects of interest within the map-modified LIDAR data determined at 508. In some implementations, detecting objects of interest at 510 can include providing the map-modified LIDAR data determined at 508 as input to a machine-learned detector model (e.g., machine-learned detector model 230 of FIG. 2). In response to receiving the map-modified LIDAR data, the machine-learned detector model can be trained to generate as output a plurality of detections corresponding to identified objects of interest within the map-modified LIDAR data. In some implementations, a machine-learned detector model employed to detect objects of interest at 510 can be trained by applying map data dropout such that the machine-learned detector model is robust to the availability of the geographic prior data. In some implementations, detecting objects of interest at 510 can include determining a plurality of object classifications and/or bounding shapes corresponding to the detected objects of interest. For example, in one implementation, the plurality of objects detected at 510 can include a plurality of bounding shapes at locations within the map-modified LIDAR data having a confidence score associated with an object likelihood that is above a threshold value. In some implementations, detecting objects of interest at 510 can include determining one or more of a classification indicative of a likelihood that each of the one or more objects of interest comprises a class of object from a predefined group of object classes (e.g., vehicle, bicycle, pedestrian, etc.) and a bounding shape representative of a size, a location, and an orientation of each the one or more objects of interest.

At 512, method 500 can include determining a motion plan based on the object detections determined by the machine-learned detector model at 510. In some implementations, determining a motion plan at 512 can be implemented by motion planning system 128 of FIG. 1.

At 514, method 500 can include controlling motion of an autonomous vehicle (e.g., vehicle 102 of FIG. 1) based at least in part on the motion plan determined at 512. In some implementations, controlling motion of an autonomous vehicle can be implemented by vehicle control system 138 of FIG. 1.

Although FIG. 11 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

Figure 12:
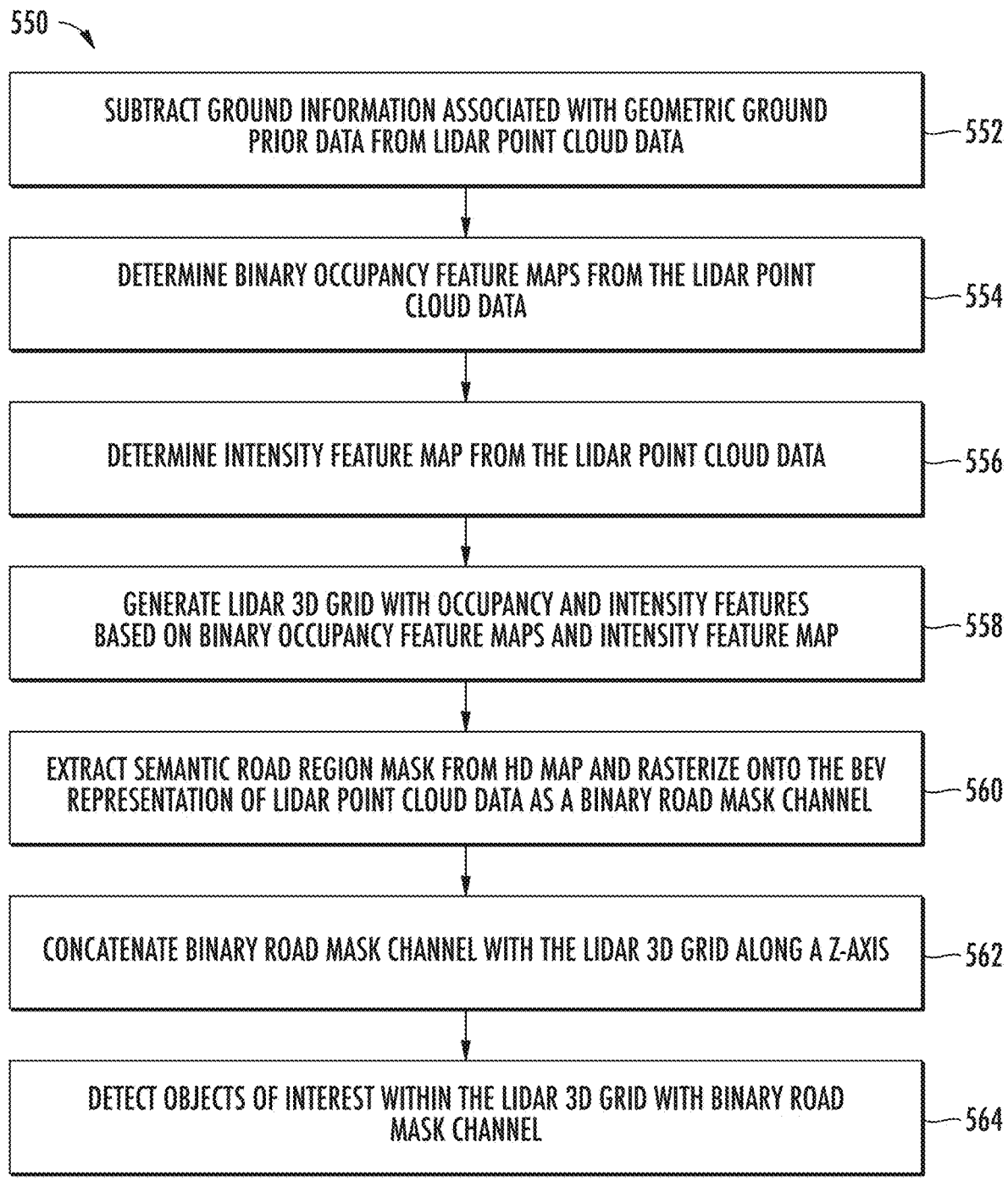
FIG. 12 depicts a flowchart diagram of a LIDAR data modification method according to example embodiments of the present disclosure.

FIG. 12 depicts a flowchart diagram of a LIDAR data modification method 550 according to example embodiments of the present disclosure. One or more portions of method 550 can be implemented as part of determining map-modified LIDAR data at 508 in FIG. 11. One or more portion(s) of the method 550 can be implemented by one or more computing devices such as, for example, the computing device(s) within vehicle computing system 112 of FIG. 1, object detection system 200 of FIG. 2, or computing system 710 of FIG. 10. Moreover, one or more portion(s) of the method 550 can be implemented as an algorithm on the hardware components of the device(s) described herein to, for example, implement map fusion, object detection and associated motion planning for an autonomous vehicle. In some implementations, Referring more particularly to FIG. 12, a computing system (e.g., object detection system 200 of FIG. 2 in conjunction with computing system 112 of FIG. 1) including one or more computing devices can implement one or more steps of method 550.

At 552, method 550 can include subtracting ground information associated with geometric ground prior data from LIDAR point cloud data.

At 554-558, method 550 can include steps for generating a discretized representation of LIDAR point cloud data. For example, at 554, method 550 can include determining binary occupancy feature maps from the LIDAR point cloud data. At 556, method 550 can include determining an intensity feature map from the LIDAR point cloud data. At 558, method 550 can include generating a LIDAR three-dimensional grid with occupancy and intensity features based on the binary occupancy feature maps and the intensity feature map.

At 560-562, method 550 can include steps for modifying a discretized representation of the LIDAR point cloud data (e.g., the LIDAR 3D grid generated at 558). More particularly, at 560, method 500 can include extracting a semantic road region mask from a high definition map and rasterizing the semantic road region mask onto the LIDAR point cloud data as a binary road mask channel. At 562, method 550 can include concatenating along a z-axis the binary road mask channel determined at 560 with the LIDAR 3D grid generated at 558.

At 564, method 550 can include detecting objects of interest within the LIDAR 3D grid with the binary road mask channel. Detecting objects of interest at 564 can involve a similar approach to that described in detecting objects of interest at 510 of FIG. 11.

Although FIG. 12 depicts steps performed in a particular order for purposes of illustration and discussion, the methods of the present disclosure are not limited to the particularly illustrated order or arrangement. The various steps of the method 550 can be omitted, rearranged, combined, and/or adapted in various ways without deviating from the scope of the present disclosure.

Figure 13:
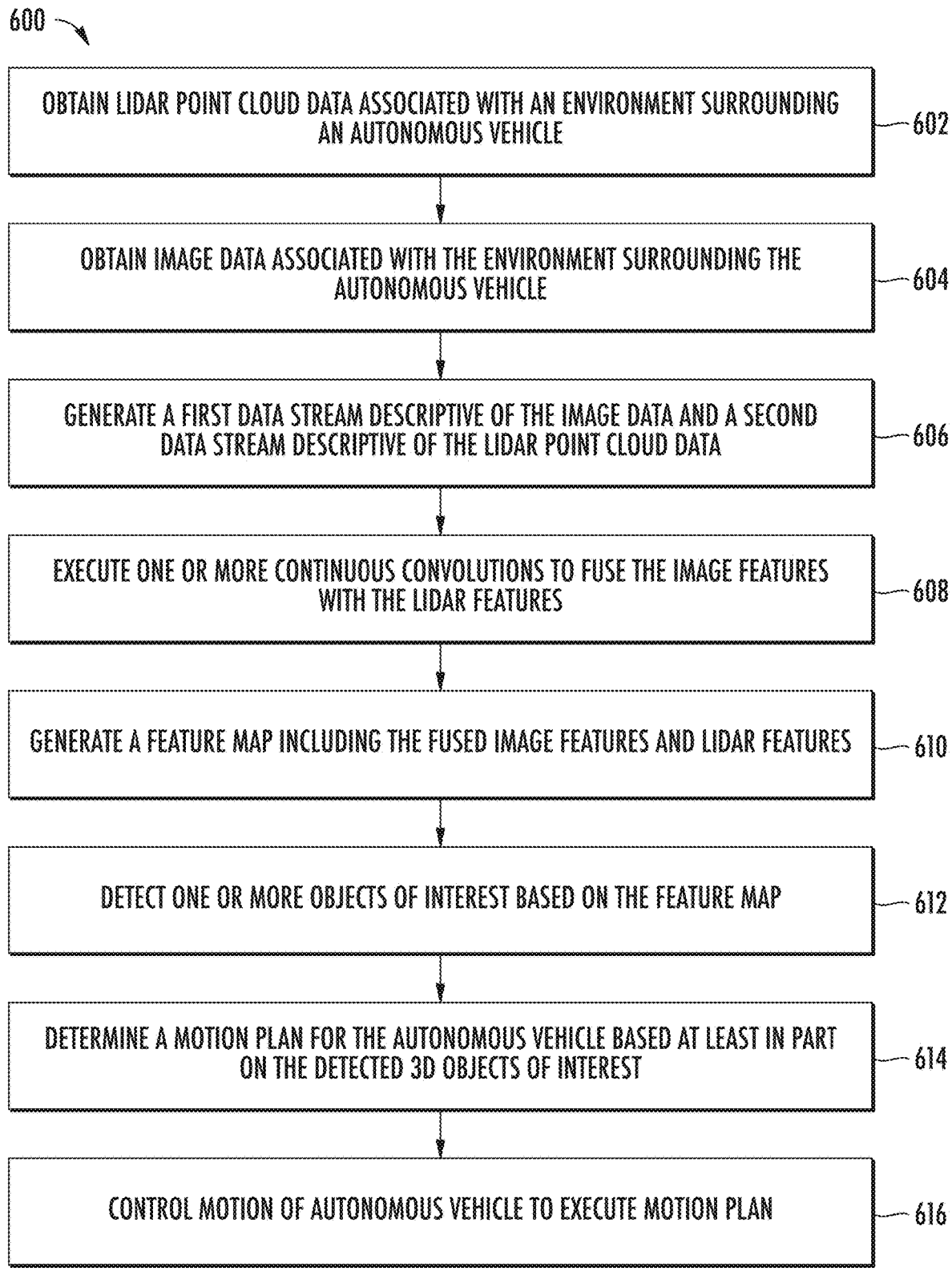
FIG. 13 depicts a flowchart diagram of a second example object detection method according to example embodiments of the present disclosure.

FIG. 13 depicts a flowchart diagram of a second example object detection method 600 according to example embodiments of the present disclosure. Method 600 can generally correspond to a method of object detection that exploits deep sensor fusion in accordance with the disclosed technology.

One or more portion(s) of the method 600 can be implemented by one or more computing devices such as, for example, the computing device(s) within vehicle computing system 112 of FIG. 1, object detection system 200 of FIG. 2, or computing system 710 of FIG. 10. Moreover, one or more portion(s) of the method 600 can be implemented as an algorithm on the hardware components of the device(s) described herein to, for example, implement map fusion, object detection and associated motion planning for an autonomous vehicle. In some implementations, Referring more particularly to FIG. 13, a computing system (e.g., object detection system 200 of FIG. 2 in conjunction with computing system 112 of FIG. 1) including one or more computing devices can implement one or more steps of method 600. At 602, method 600 can include obtaining/receiving LIDAR point cloud data associated with an environment surrounding an autonomous vehicle. In some implementations, the LIDAR point cloud data obtained at 602 can correspond to sensor data 116 of FIG. 1 and/or LIDAR point cloud data 214 of FIG. 2. In some implementations, the LIDAR point cloud data obtained at 602 can include a projected bird's eye view representation of LIDAR data obtained relative to an autonomous vehicle.

At 604, method 600 can include obtaining/receiving image data associated with the environment surrounding an autonomous vehicle. In some implementations, the image data obtained at 604 can correspond to sensor data 116 of FIG. 1 and/or image data 212 of FIG. 2.

At 606, method 600 can include generating a first data stream descriptive of aspects of the image data (e.g., the image data obtained at 604) and a second data stream descriptive of aspects of the LIDAR point cloud data (e.g., the LIDAR point cloud data obtained at 602). In some implementations, generating a first data stream and a second data stream at 606 can be implemented as part of a machine-learned sensor fusion model (e.g., sensor fusion model 300 of FIG. 4 or other machine-learned neural network or other model).

Figure 14:
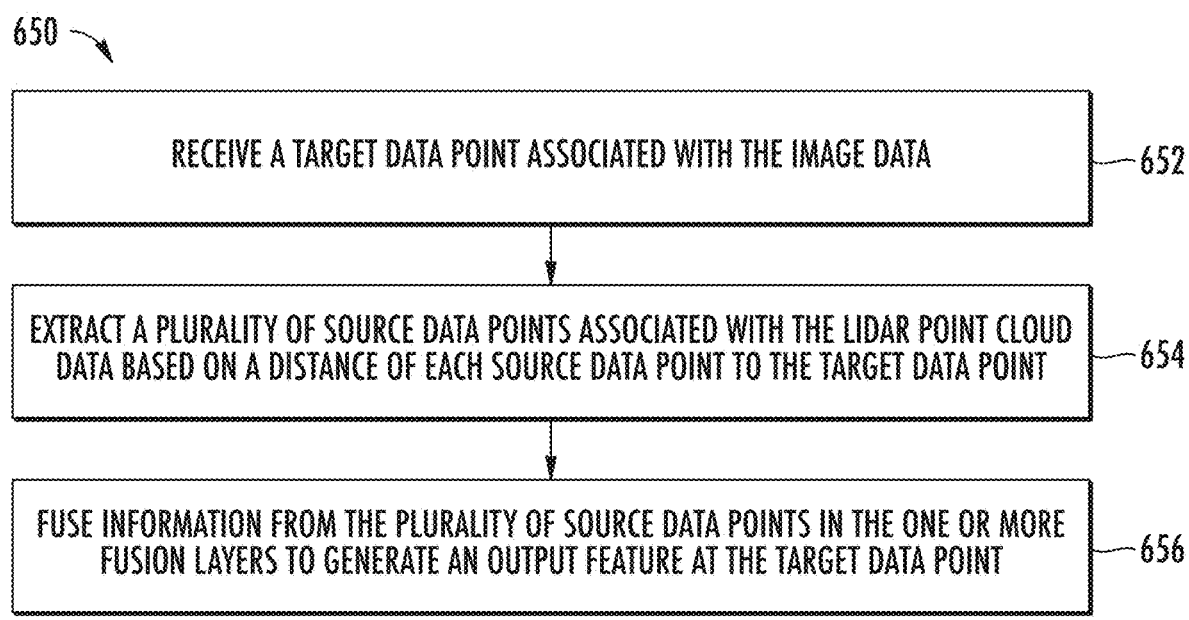
FIG. 14 depicts a flowchart diagram of a continuous convolution method according to example embodiments of the present disclosure.

At 608, method 600 can include executing one or more continuous convolutions to fuse the image features from the first data stream with the LIDAR features from the second data stream as determined, for example, at 606. In some implementations, executing one or more continuous convolutions at 608 can be implemented as part of a machine-learned sensor fusion model (e.g., sensor fusion model 300 of FIG. 4 or other machine-learned neural network or other model). More particular aspects of one example of executing one or more continuous convolutions at 608 are depicted in FIG. 14.

At 610, method 600 can include generating a feature map comprising the fused image features from the first data stream and the LIDAR features from the second data stream. In some implementations, generating a feature map at 610 includes generating a feature map having a bird's eye view representation.

At 612, method 600 can include detecting three-dimensional objects of interest within the feature map determined at 608. In some implementations, detecting objects of interest at 612 can include providing the feature map generated at 610 as input to a machine-learned detector model (e.g., machine-learned detector model 230 of FIG. 2). In response to receiving the feature map, the machine-learned detector model can be trained to generate as output a plurality of detections corresponding to identified objects of interest within the feature map. In some implementations, detecting objects of interest at 612 can include determining a plurality of object classifications and/or bounding shapes corresponding to the detected objects of interest. For example, in one implementation, the plurality of objects detected at 612 can include a plurality of bounding shapes at locations within the feature map having a confidence score associated with an object likelihood that is above a threshold value. In some implementations, detecting objects of interest at 612 can include determining one or more of a classification indicative of a likelihood that each of the one or more objects of interest comprises a class of object from a predefined group of object classes (e.g., vehicle, bicycle, pedestrian, etc.) and a bounding shape representative of a size, a location, and an orientation of each the one or more objects of interest.

At 614, method 600 can include determining a motion plan based on the object detections determined by the machine-learned detector model at 612. In some implementations, determining a motion plan at 614 can be implemented by motion planning system 128 of FIG. 1.

At 616, method 600 can include controlling motion of an autonomous vehicle (e.g., vehicle 102 of FIG. 1) based at least in part on the motion plan determined at 614. In some implementations, controlling motion of an autonomous vehicle can be implemented by vehicle control system 138 of FIG. 1.

Although FIG. 13 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

FIG. 14 depicts a flowchart diagram of a continuous convolution method 650 according to example embodiments of the present disclosure. One or more portions of method 650 can be implemented as part of executing one or more continuous convolutions at 608 in FIG. 13. One or more portion(s) of the method 650 can be implemented by one or more computing devices such as, for example, the computing device(s) within vehicle computing system 112 of FIG. 1, object detection system 200 of FIG. 2, or computing system 710 of FIG. 10. Moreover, one or more portion(s) of the method 650 can be implemented as an algorithm on the hardware components of the device(s) described herein to, for example, implement map fusion, object detection and associated motion planning for an autonomous vehicle. In some implementations, Referring more particularly to FIG. 14, a computing system (e.g., object detection system 200 of FIG. 2 in conjunction with computing system 112 of FIG. 1) including one or more computing devices can implement one or more steps of method 650.

At 652, method 650 can include receiving a target data point associated with the image data (e.g., the image data obtained at 604 in FIG. 13.

At 654, method 650 can include extracting a plurality of source data points associated with the LIDAR point cloud data (e.g., the LIDAR point cloud data obtained at 602 of FIG. 13) based on a distance of each source data point to the target data point. In some implementations, extracting at 654 a plurality of source data points associated with the LIDAR point cloud data includes using a K nearest neighbors (KNN) pooling technique. More particularly, in some implementations, extracting a plurality of source data points associated with the LIDAR point cloud data can include generating a mapping between the a target domain associated with the image data and a source domain associated with the LIDAR point cloud data based on a calibration of the camera system and the LIDAR system.

At 656, method 650 can include fusing information from the plurality of source data points in the one or more fusion layers to generate an output feature at the target data point. In some implementations, fusing information at 656 from the plurality of source data points in the one or more fusion layers to generate an output feature at the target data point can include concatenating a plurality of LIDAR features associated with the LIDAR point cloud data at the plurality of source data points.

In some examples, one or more steps 652-656 of method 650 can be implemented via a machine-learned sensor fusion model (e.g., sensor fusion model 300 of FIG. 4) such as one including one or more neural networks. In such examples, the sensor fusion model can include one or more fusion layers that include one or more multi-layer perceptrons each having a first portion and a second portion. The first portion of each multi-layer perceptron can be configured to extract at 654 the plurality of source data points associated with the LIDAR point cloud data given the target data point associated with the image data. The second portion of each multi-layer perceptron can be configured to encode an offset between each of the source data points associated with the LIDAR point cloud data and the target data point associated with the image data. In some implementations, the offset between each of the source data points associated with the LIDAR point cloud data and the target data point associated with the image data can be a subpixel offset between a continuous coordinate associated with each source data point and a discrete location of the target data point when projected onto an image plane. In some implementations, the offset can additionally or alternatively be a three-dimensional offset between each of the source data points and the target data point.

Figure 15:
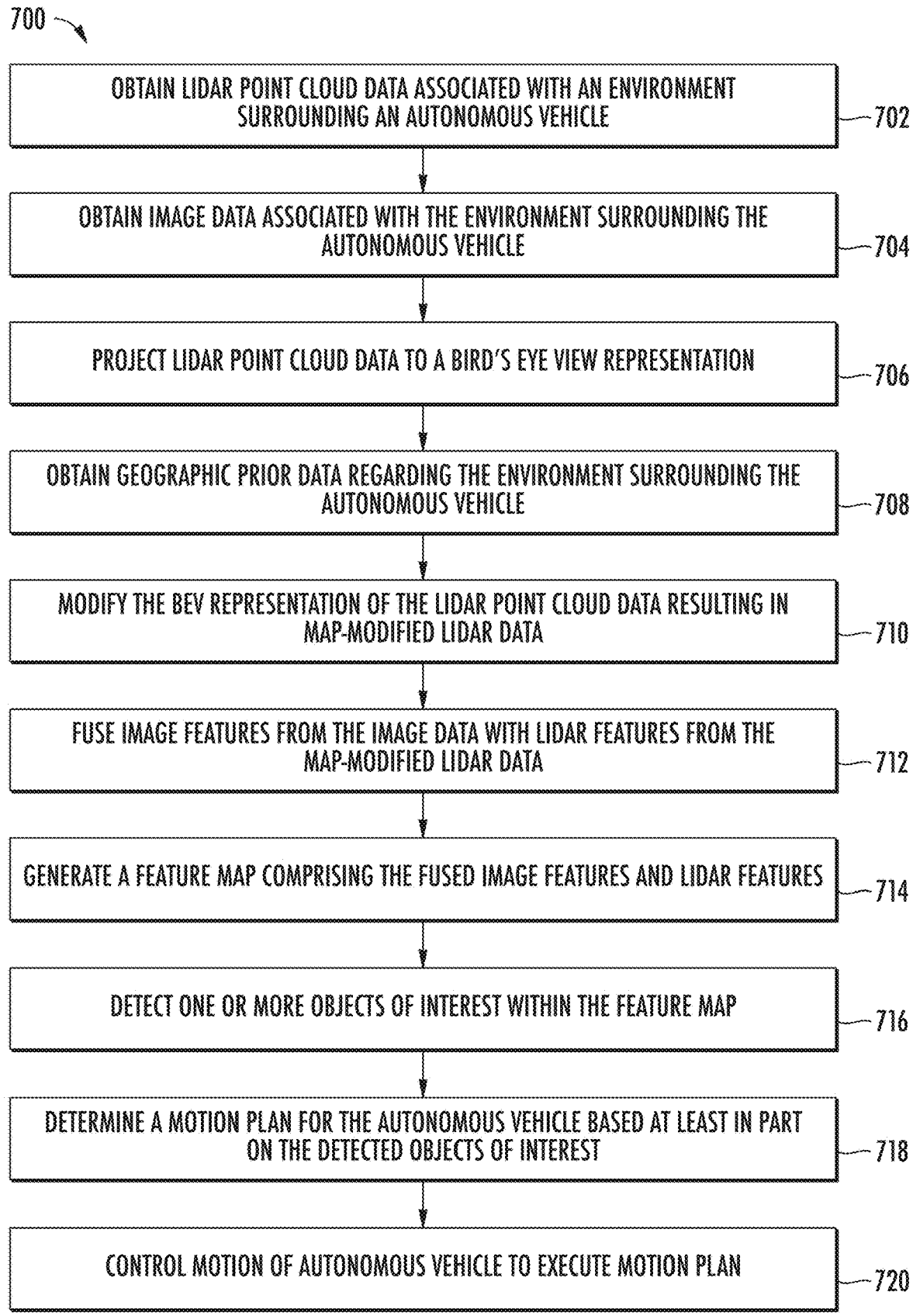
FIG. 15 depicts a flowchart diagram of a third example object detection method according to example embodiments of the present disclosure.

FIG. 15 depicts a flowchart diagram of a third example object detection method 700 according to example embodiments of the present disclosure. Method 700 can generally correspond to a method of object detection that exploits both HD map fusion and deep sensor fusion in accordance with the disclosed technology. One or more portion(s) of the method 700 can be implemented by one or more computing devices such as, for example, the computing device(s) within vehicle computing system 112 of FIG. 1, object detection system 200 of FIG. 2, or computing system 710 of FIG. 10. Moreover, one or more portion(s) of the method 700 can be implemented as an algorithm on the hardware components of the device(s) described herein to, for example, implement map fusion, sensor fusion, object detection and associated motion planning for an autonomous vehicle.

Referring more particularly to FIG. 15, a computing system (e.g., object detection system 200 of FIG. 2 in conjunction with computing system 112 of FIG. 1) including one or more computing devices can implement one or more steps of method 700. At 702, method 700 can include obtaining/receiving LIDAR point cloud data associated with an environment surrounding an autonomous vehicle. In some implementations, the LIDAR point cloud data obtained at 702 can correspond to sensor data 116 of FIG. 1 and/or LIDAR point cloud data 214 of FIG. 2. In some implementations, the LIDAR point cloud data obtained at 702 can include a projected bird's eye view representation of LIDAR data obtained relative to an autonomous vehicle.

At 704, method 700 can include obtaining/receiving image data associated with the environment surrounding an autonomous vehicle. In some implementations, the image data obtained at 704 can correspond to sensor data 116 of FIG. 1 and/or image data 212 of FIG. 2.

At 706, in some implementations, the method 700 can include projecting the LIDAR point cloud data obtained at 702 to a bird's eye view representation.

At 708, method 700 can include obtaining/receiving map data associated with a surrounding geographic environment of the autonomous vehicle. In some implementations, the map data obtained at 708 can correspond to map data 122 of FIG. 1 and/or map data available via map system 206 of FIG. 2. In some implementations, the map data obtained at 708 can be a bird's eye view representation of a surrounding geographic environment of the autonomous vehicle in the form of geographic prior data. For example, the geographic prior data obtained at 708 can include geometric ground prior data and/or semantic road prior data.

In some implementations, obtaining/receiving geographic prior data at 708 can include obtaining/receiving geographic prior data from a high-definition (HD) map database (e.g., HD map database 216 of FIG. 2). In some implementations, such as when an HD maps database is inaccessible during real-time operations, obtaining/receiving geographic prior data at 708 can include obtaining/receiving geographic prior data from a map estimation system (e.g., map estimation system 218 of FIGS. 2-3). Such a map estimation system can be to generate estimated geographic prior data regarding the environment surrounding the autonomous vehicle when the geographic prior data from the map system is unavailable. In some implementations, obtaining estimated geographic prior data at 708 as generated by a map estimation system can include obtaining a bird's eye view representation of one or more of estimated geometric ground prior data or estimated semantic road prior data. In some implementations, a map estimation system configured to generate the geographic prior data obtained at 708 can include a machine-learned map estimation model. The machine-learned map estimation model can include a first component dedicated to determining the bird's eye view representation of the estimated geometric ground prior data and a second component dedicated to determining the bird's eye view representation of the estimated semantic road prior data.

At 710, method 500 can include modifying the LIDAR point cloud data obtained at 702 and/or projected into a bird's eye view representation at 706 based on the geographic prior data obtained at 708 resulting in map-modified LIDAR data. For example, in some implementations modifying the LIDAR point cloud data at 710 can include modifying a bird's eye view representation of the LIDAR point cloud data based on the geometric ground prior data (e.g., by subtracting ground information associated with the geometric ground prior data from the LIDAR point cloud data). In some implementations, modifying the LIDAR point cloud data at 710 can additionally or alternatively include modifying a discretized representation of the LIDAR point cloud data based on the semantic road prior data. More particular details regarding the map fusion process at 710 is depicted in and discussed with reference to FIG. 12. In some implementations, modifying the LIDAR point cloud data based on the geographic prior data to determine map-modified LIDAR data at 710 can be implemented by fusion system 208 (e.g., more particularly, by map fusion system 220).

At 712, method 700 can include fusing image features from image data (e.g., image data obtained at 704) with LIDAR features from map-modified LIDAR data (e.g., the map-modified LIDAR data determined at 710). In some implementations, fusing at 712 can include executing one or more continuous convolutions to fuse image features from a first data stream with LIDAR features from a second data stream. In some implementations, executing one or more continuous convolutions as part of fusing at 712 can be implemented as part of a machine-learned sensor fusion model (e.g., sensor fusion model 300 of FIG. 4 or other machine-learned neural network or other model). More particular aspects of one example of executing one or more continuous convolutions for fusing at 712 are depicted in FIG. 14.

At 714, method 700 can include generating a feature map comprising the fused image features and LIDAR features determined at 712.

At 716, method 700 can include detecting three-dimensional objects of interest within the feature map determined at 714. In some implementations, detecting objects of interest at 716 can include providing the feature map generated at 714 as input to a machine-learned detector model (e.g., machine-learned detector model 230 of FIG. 2). In response to receiving the feature map, the machine-learned detector model can be trained to generate as output a plurality of detections corresponding to identified objects of interest within the feature map. In some implementations, detecting objects of interest at 716 can include determining a plurality of object classifications and/or bounding shapes corresponding to the detected objects of interest. For example, in one implementation, the plurality of objects detected at 716 can include a plurality of bounding shapes at locations within the feature map having a confidence score associated with an object likelihood that is above a threshold value. In some implementations, detecting objects of interest at 716 can include determining one or more of a classification indicative of a likelihood that each of the one or more objects of interest comprises a class of object from a predefined group of object classes (e.g., vehicle, bicycle, pedestrian, etc.) and a bounding shape representative of a size, a location, and an orientation of each the one or more objects of interest.

At 718, method 700 can include determining a motion plan based on the object detections determined by the machine-learned detector model at 716. In some implementations, determining a motion plan at 718 can be implemented by motion planning system 128 of FIG. 1.

At 720, method 700 can include controlling motion of an autonomous vehicle (e.g., vehicle 102 of FIG. 1) based at least in part on the motion plan determined at 718. In some implementations, controlling motion of an autonomous vehicle can be implemented by vehicle control system 138 of FIG. 1.

Although FIG. 15 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

Figure 16:
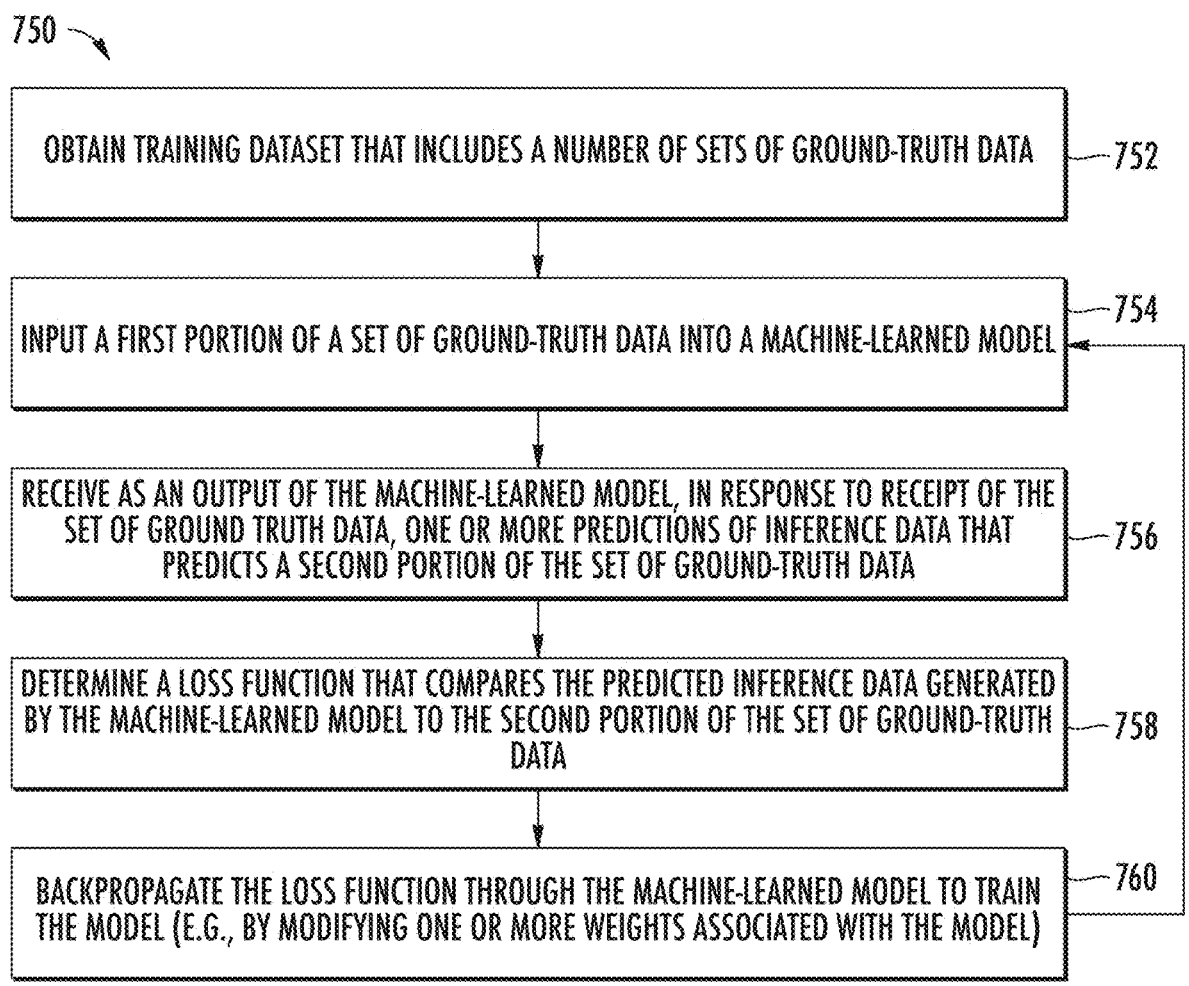
FIG. 16 depicts a flowchart diagram of an example machine learning method according to example embodiments of the present disclosure.

FIG. 16 depicts a flowchart diagram of an example machine learning method 750 according to example embodiments of the present disclosure. One or more portion(s) of the model training method 750 can be implemented by one or more computing devices such as, for example, the computing device(s) within vehicle computing system 112 of FIG. 1, object intention determination system 200 of FIG. 2, or remote computing system 750 of FIG. 17. Moreover, one or more portion(s) of the model training method 750 can be implemented as an algorithm on the hardware components of the device(s) described herein to, for example, determine object intention and associated motion planning for an autonomous vehicle. The model training method of FIG. 16 can be used to train one or more of the machine-learned models described herein, including but not limited to machine-learned detector model 230 of FIG. 2, machine-learned map estimation model 250 of FIG. 3, and/or machine-learned sensor fusion model 300 of FIG. 4.

Referring more particularly to FIG. 16, a computing system including one or more computing devices can implement one or more steps of method 750. At 752, method 750 can involve one or more computing devices included within a computing system (e.g., computing systems 104, 112, 200, 810, 850, and/or the like) obtaining a training dataset that includes a number of sets of ground-truth data. For example, to train a machine-learned model, a training dataset can be obtained that includes a large number of previously obtained representations of input data as well as corresponding labels that describe corresponding outputs associated with the corresponding input data. A training dataset can more particularly include a first portion of data corresponding to one or more representations of input data. The input data can, for example, be recorded or otherwise determined while a vehicle is in navigational operation and/or the like. The training dataset can further include a second portion of data corresponding to labels identifying outputs. The labels included within the second portion of data within the training dataset can be manually annotated, automatically annotated, or annotated using a combination of automatic labeling and manual labeling.

At 754, the computing system can input a first portion of a set of ground-truth data into a machine-learned model. For example, to train the model, a training computing system can input a first portion of a set of ground-truth data (e.g., the first portion of the training dataset) into the machine-learned model to be trained.

At 756, the computing system can receive as output of the machine-learned model, in response to receipt of the ground-truth data, one or more inferences that predict a second portion of the set of ground-truth data. For example, in response to receipt of a first portion of a set of ground-truth data, the machine-learned model can output inferences. This output of the machine-learned model can predict the remainder of the set of ground-truth data (e.g., the second portion of the training dataset).

At 758, the computing system can determine a loss function that compares the predicted inferences generated by the machine-learned model to the second portion of the set of ground-truth data. For example, after receiving such predictions, a training computing system can apply or otherwise determine a loss function that compares the inferences output by the machine-learned model to the remainder of the ground-truth data (e.g., ground-truth labels) which the model attempted to predict.

At 760, the computing system can backpropogate the loss function through the machine-learned model to train the model (e.g., by modifying one or more weights associated with the model). This process of inputting ground-truth data, determining a loss function, and backpropagating the loss function through the model can be repeated numerous times as part of training the model. For example, the process can be repeated for each of numerous sets of ground-truth data provided within the training dataset.

Figure 17:
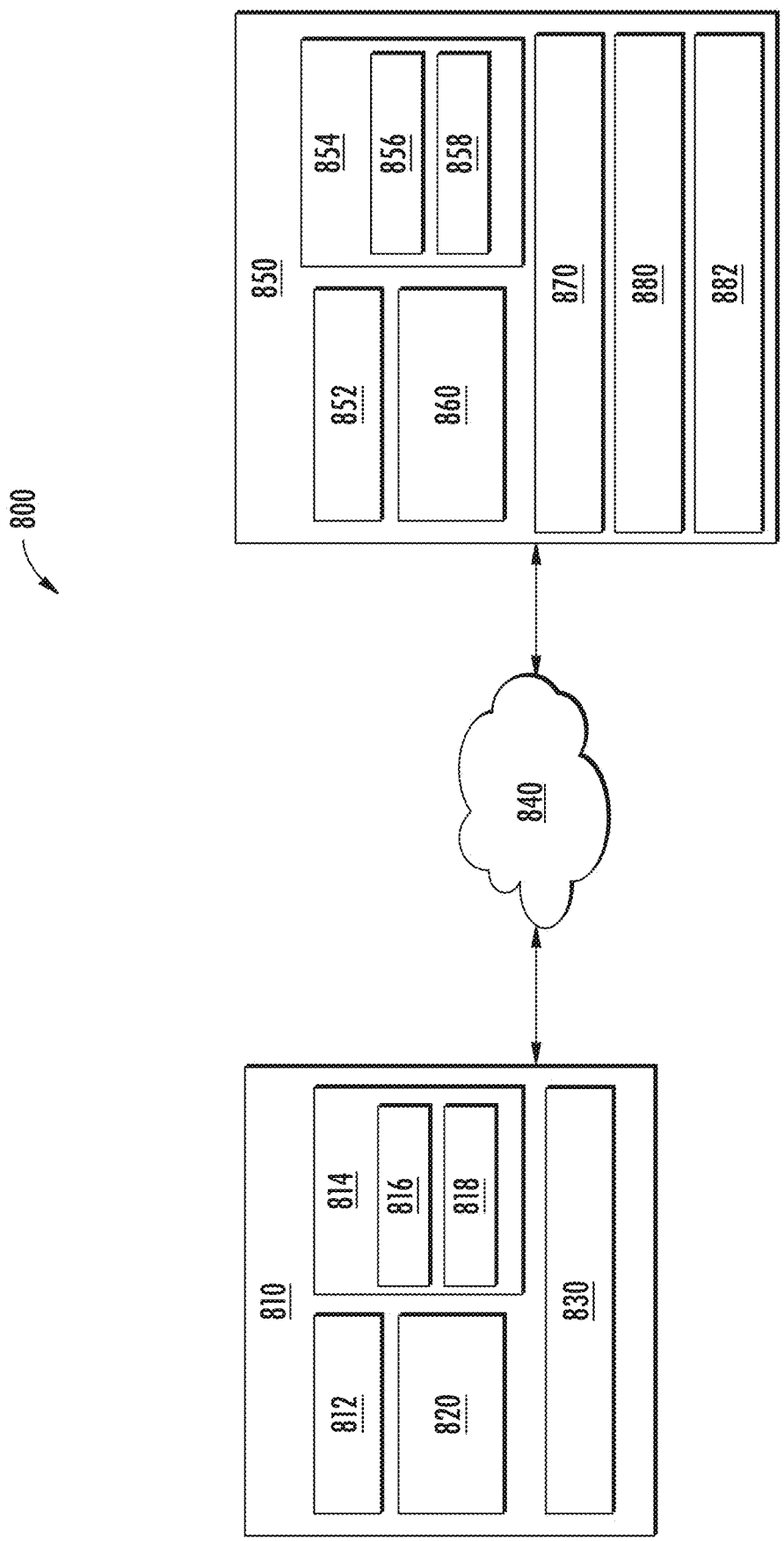
FIG. 17 depicts a block diagram of an example computing system according to example embodiments of the present disclosure.

FIG. 17 depicts a block diagram of an example computing system 800 according to example embodiments of the present disclosure. The example computing system 800 includes a computing system 810 and a machine learning computing system 850 that are communicatively coupled over a network 840.

In some implementations, the computing system 810 can perform various operations including map estimation, map fusion, sensor fusion, and object detection as described herein. In some implementations, the computing system 810 can be included in an autonomous vehicle (e.g., the vehicle 102 of FIG. 1). For example, the computing system 810 can be on-board the autonomous vehicle. In other implementations, the computing system 810 is not located on-board the autonomous vehicle. For example, the computing system 810 can operate offline to perform operations. Further, the computing system 810 can include one or more distinct physical computing devices.

The computing system 810 includes one or more processors 812 and a memory 814. The one or more processors 812 can be any suitable processing device (e.g., a processor core, a microprocessor, an ASIC, a FPGA, a controller, and/or a microcontroller) and can be one processor or a plurality of processors that are operatively connected. The memory 814 can include one or more non-transitory computer-readable storage media, including RAM, ROM, EEPROM, EPROM, one or more memory devices, flash memory devices, and/or combinations thereof.

The memory 814 can store information that can be accessed by the one or more processors 812. For instance, the memory 814 (e.g., one or more non-transitory computer-readable storage mediums, memory devices) can store data 816 that can be obtained, received, accessed, written, manipulated, created, and/or stored. The data 816 can include, for instance, data associated with the determination of object detections and intentions as described herein. In some implementations, the computing system 810 can obtain data from one or more memory devices that are remote from the system 810.

The memory 814 can also store computer-readable instructions 818 that can be executed by the one or more processors 812. The instructions 818 can be software written in any suitable programming language or can be implemented in hardware. Additionally, or alternatively, the instructions 818 can be executed in logically and/or virtually separate threads on the one or more processors 812.

For example, the memory 814 can store instructions 818 that when executed by the one or more processors 812 cause the one or more processors 812 to perform any of the operations and/or functions described herein, including, for example, determining object intentions.

According to an aspect of the present disclosure, the computing system 810 can store or include one or more machine-learned models 830. As examples, the machine-learned models 830 can be or can otherwise include various machine-learned models including, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. In some implementations, machine-learned models 830 can include a machine-learned detector model (e.g., machine-learned detector model 230 of FIG. 2), a machine-learned map estimation model (e.g., machine-learned map estimation model 250 of FIG. 3), and/or a machine-learned sensor fusion model (e.g., machine-learned sensor fusion model 300 of FIG. 4).

In some implementations, the computing system 810 can receive the one or more machine-learned models 830 from the machine learning computing system 850 over the network 840 and can store the one or more machine-learned models 830 in the memory 814. The computing system 810 can then use or otherwise implement the one or more machine-learned models 830 (e.g., by the one or more processors 812). In particular, the computing system 810 can implement the one or more machine-learned models 830 to implement map estimation, sensor fusion, and/or object detection.

The machine learning computing system 850 includes one or more processors 852 and memory 854. The one or more processors 852 can be any suitable processing device (e.g., a processor core, a microprocessor, an ASIC, a FPGA, a controller, and/or a microcontroller) and can be one processor or a plurality of processors that are operatively connected. The memory 854 can include one or more non-transitory computer-readable storage media, including RAM, ROM, EEPROM, EPROM, one or more memory devices, flash memory devices, and/or combinations thereof.

The memory 854 can store information that can be accessed by the one or more processors 852. For instance, the memory 854 (e.g., one or more non-transitory computer-readable storage mediums, memory devices) can store data 856 that can be obtained, received, accessed, written, manipulated, created, and/or stored. The data 856 can include, for instance, data associated with the determination of the object intentions including detection outputs and forecasting outputs such as trajectory data, intent data, and/or the like as described herein. In some implementations, the machine learning computing system 850 can obtain data from one or more memory devices that are remote from the system 850.

The memory 854 can also store computer-readable instructions 858 that can be executed by the one or more processors 852. The instructions 858 can be software written in any suitable programming language or can be implemented in hardware. Additionally, or alternatively, the instructions 858 can be executed in logically and/or virtually separate threads on the one or more processors 852.

For example, the memory 854 can store instructions 858 that when executed by the one or more processors 852 cause the one or more processors 852 to perform any of the operations and/or functions described herein, including, for example, map estimation, map fusion, sensor fusion, object detection, and the like.

In some implementations, the machine learning computing system 850 includes one or more server computing devices. If the machine learning computing system 850 includes multiple server computing devices, such server computing devices can operate according to various computing architectures, including, for example, sequential computing architectures, parallel computing architectures, or some combination thereof.

In addition or alternatively to the one or more machine-learned models 830 at the computing system 810, the machine learning computing system 850 can include one or more machine-learned models 870. As examples, the one or more machine-learned models 870 can be or can otherwise include various machine-learned models including, for example, neural networks (e.g., deep convolutional neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. In some implementations, machine-learned models 870 can include a machine-learned detector model (e.g., machine-learned detector model 230 of FIG. 2), a machine-learned map estimation model (e.g., machine-learned map estimation model 250 of FIG. 3), and/or a machine-learned sensor fusion model (e.g., machine-learned sensor fusion model 300 of FIG. 4).

As an example, the machine learning computing system 850 can communicate with the computing system 810 according to a client-server relationship. For example, the machine learning computing system 850 can implement the one or more machine-learned models 870 to provide a service to the computing system 810. For example, the service can provide for determining object intentions as described herein.

Thus the one or more machine-learned models 830 can be located and used at the computing system 810 and/or the one or more machine-learned models 870 can be located and used at the machine learning computing system 850.

In some implementations, the machine learning computing system 850 and/or the computing system 810 can train the machine-learned models 830 and/or 870 through use of a model trainer 880. The model trainer 880 can train the machine-learned models 830 and/or 870 using one or more training or learning algorithms. One example training technique involves implementation of the method 750 of FIG. 16. One example training technique is backwards propagation of errors. In some implementations, the model trainer 880 can perform supervised training techniques using a set of labeled training data. In other implementations, the model trainer 880 can perform unsupervised training techniques using a set of unlabeled training data. The model trainer 880 can perform a number of generalization techniques to improve the generalization capability of the models being trained. Generalization techniques include weight decays, dropouts, or other techniques.

In particular, the model trainer 880 can train the one or more machine-learned models 830 and/or the one or more machine-learned models 870 based on a set of training data 882. The training data 882 can include, for example, a set of map estimation training data for training a machine-learned map estimation model, which might include a first portion of data corresponding to LIDAR point cloud data as well as second portion of data corresponding to labels identifying ground truth geographic prior data. In other examples, training data 882 can include a set of sensor fusion training data for training a machine-learned sensor fusion model, which might include a first portion of data corresponding to first and second data streams (e.g., an image data stream and BEV LIDAR data stream) as well as a second portion of data corresponding to labels identifying ground truth feature map data. In other examples, training data 882 can include a set of object detector training data for training a machine-learned detector model, which might include a first portion of data corresponding to map-modified LIDAR data and/or feature maps as well as a second portion of data corresponding to labels identifying ground truth detector outputs (e.g., classifications and/or bounding shapes). The model trainer 880 can be implemented in hardware, firmware, and/or software controlling one or more processors.

The computing system 810 can also include a network interface 820 used to communicate with one or more systems or devices, including systems or devices that are remotely located from the computing system 810. The network interface 820 can include any circuits, components, and/or software, for communicating with one or more networks (e.g., the network 840). In some implementations, the network interface 820 can include, for example, one or more of a communications controller, receiver, transceiver, transmitter, port, conductors, software, and/or hardware for communicating data. Similarly, the machine learning computing system 850 can include a network interface 860.

The networks 840 can be any type of network or combination of networks that allows for communication between devices. In some embodiments, the network 840 can include one or more of a local area network, wide area network, the Internet, secure network, cellular network, mesh network, peer-to-peer communication link, and/or some combination thereof, and can include any number of wired or wireless links. Communication over the network 840 can be accomplished, for instance, via a network interface using any type of protocol, protection scheme, encoding, format, and/or packaging.

FIG. 17 illustrates one example computing system 800 that can be used to implement the present disclosure. Other computing systems can be used as well. For example, in some implementations, the computing system 810 can include the model trainer 880 and the training dataset 882. In such implementations, the machine-learned models 830 can be both trained and used locally at the computing system 810. As another example, in some implementations, the computing system 810 is not connected to other computing systems.

In addition, components illustrated and/or discussed as being included in one of the computing systems 810 or 850 can instead be included in another of the computing systems 810 or 850. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 18:
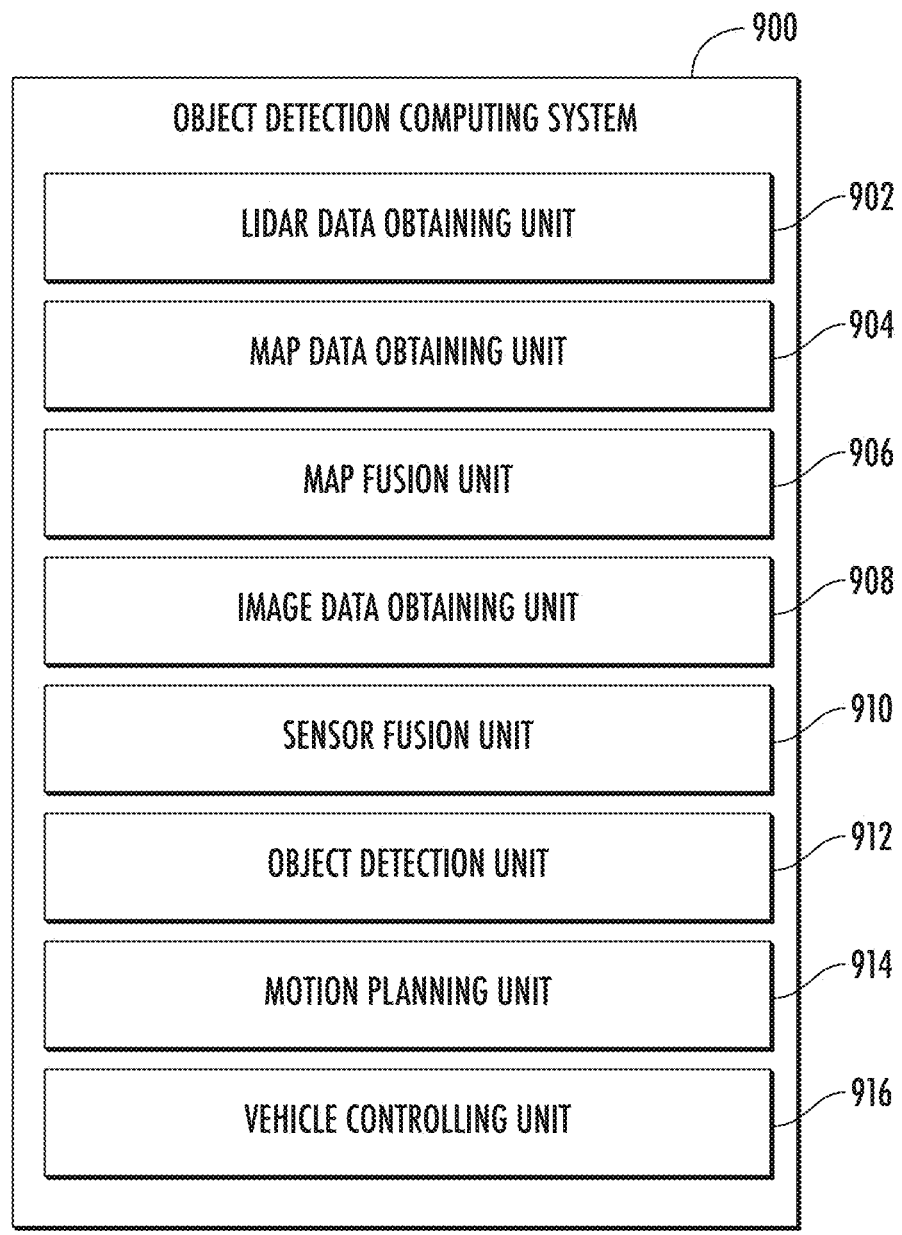
FIG. 18 depicts a block diagram of an example object detection computing system according to example embodiments of the present disclosure.

Various means can be additionally or alternatively configured to perform the methods and processes described herein. FIG. 18 depicts an example system 900 with units 902-916 for performing operations and functions according to example embodiments of the present disclosure. For example, an object detection computing system 900 can include LIDAR data obtaining unit(s) 902, map data obtaining unit(s) 904, map fusion unit(s) 906, image data obtaining unit(s) 908, sensor fusion unit(s) 910, object detection unit(s) 912, motion planning unit(s) 914, vehicle controlling unit(s) 916, and/or other means for performing the operations and functions described herein. In some implementations, one or more of the units 902-916 may be implemented separately. In some implementations, one or more units 902-916 may be a part of or included in one or more other units. These means can include processor(s), microprocessor (s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain LIDAR point cloud data associated with an environment surrounding an autonomous vehicle. The means can be configured to project the LIDAR point cloud data to a bird's eye view representation of the LIDAR point cloud data. A LIDAR data obtaining unit 902 is one example of a means for obtaining such LIDAR point cloud data as described herein.

The means can be configured to obtain geographic prior data regarding the environment surrounding the autonomous vehicle. In some implementations, the means for obtaining geographic prior data can be configured to obtain geometric ground prior data and/or semantic road prior data via an HD map database and/or a map estimation system. In some implementations, the geographic prior data can be determined in a bird's eye view representation. In some implementations, the means can be configured to generate estimated geographic prior data regarding the environment surrounding the autonomous vehicle, wherein the estimated geographic prior data includes a bird's eye view representation of one or more of estimated geometric ground prior data or estimated semantic road prior data. A map data obtaining unit 904 is one example of a means for obtaining such geographic prior map data as described herein.

The means can be configured to modify the bird's eye view representation of the LIDAR point cloud data based on the geographic prior data resulting in map-modified LIDAR data. More particularly, in some implementations, the means can be configured to modify the bird's eye view representation of the LIDAR point cloud data based on the geographic prior data includes subtracting ground information associated with the geometric ground prior data from the bird's eye view representation of the LIDAR point cloud data. The means can be configured to discretize the bird's eye view representation of the LIDAR point cloud data. The means can be configured to modify the discretized bird's eye view representation of the LIDAR point cloud data based on the semantic road prior data. The means can be configured to determine binary occupancy feature maps from the bird's eye view representation of the LIDAR point cloud data. The means can be configured to determine an intensity feature map from the bird's eye view representation of the LIDAR point cloud data. The means can be configured to generate a LIDAR three-dimensional grid with occupancy and intensity features based on the binary occupancy feature maps and the intensity feature map. The means can be configured to extract a semantic road region mask from a high definition map. The means can be configured to rasterize the semantic road region mask onto the bird's eye view representation of the LIDAR point cloud data as a binary road mask channel.

The means can be configured to concatenate the binary road mask channel with the LIDAR three-dimensional grid along a z-axis. A map fusion unit 906 is one example of a means for determining map-modified LIDAR data as described herein.

The means can be configured to obtain image data associated with an environment surrounding an autonomous vehicle. An image data obtaining unit 908 is one example of a means for obtaining such image data as described herein.

In some implementations, the means can be additionally or alternatively configured to implement continuous convolutions for multi-sensor fusion via a machine-learned neural network or other suitable means. For example, the means can be configured to generate first and second respective data streams associated with first and second sensor modalities. For example, the means can be configured to generate a first data stream descriptive of image data and a second data stream descriptive of LIDAR point cloud data. The means can be further configured to execute at the machine-learned neural network, one or more continuous convolutions to fuse the image features from the first data stream with the LIDAR features from the second data stream. More particularly, in some implementations, the means can be configured to receive a target data point associated with the image data, extract a plurality of source data points associated with the LIDAR point cloud data based on a distance of each source data point to the target data point (e.g., using a KNN pooling technique), and fuse information from the plurality of source data points in the one or more fusion layers to generate an output feature at the target data point (e.g., by concatenating a plurality of LIDAR features associated with the LIDAR point cloud data at the plurality of source data points). The means can also be configured to generate a feature map that includes the fused image features and LIDAR features. In some implementations, the feature map can be configured as a bird's eye view representation for subsequent analysis, which can advantageously maintain a data structure native to the 3D sensors such as LIDAR and facilitate training of machine-learned models employed in the corresponding fusion system. A sensor fusion unit 910 is one example of a means for implementing sensor fusion as described herein.

The means can be configured to detect three-dimensional objects of interest within the map-modified LIDAR data and/or feature map data. For example, the means can be configured to provide, as input to a machine-learned detector model, the map-modified LIDAR data and/or feature map data, and to receive, in response to providing the map-modified LIDAR data and/or feature map data as input to the machine-learned detector model, one or more detector outputs. The one or more detector outputs can include classifications and/or bounding shapes associated with object detections. An object detection unit 912 is one example of a means for determining three-dimensional object detections.

The means can be configured to determine a motion plan for the autonomous vehicle based at least in part on the detector output(s). The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit 914 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 916 is one example of a means for controlling motion of the autonomous vehicle to execute the motion plan.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method, comprising:
    obtaining image data and point cloud data, the image data and the point cloud data descriptive of an environment of an autonomous vehicle, the image data associated with a camera view;
    for a respective portion of the environment:
        determining one or more datapoints of the point cloud data associated with the respective portion;
        projecting the one or more datapoints of the point cloud data into the camera view;
        determining one or more portions of the image data respectively corresponding to the projected one or more datapoints of the point cloud; and
        generating, based at least in part on the one or more portions of the image data, an output feature associated with the respective portion of the environment; and
    generating an output feature map based at least in part on the output feature, the output feature map corresponding to a two-dimensional overhead view of the environment, the output feature map comprising a fusion of image data features and point cloud data features.

2. The method of claim 1, comprising:
    obtaining a bird's-eye-view point cloud map associated with the respective portion, the bird's-eye-view point cloud map generated using a bird's-eye-view projection of the point cloud data.

3. The method of claim 2, wherein the output feature map is characterized by a data structure also associated with the bird's-eye-view point cloud map.

4. The method of claim 3, comprising:
    generating a dense bird's-eye-view feature map using the output feature map and the bird's-eye-view point cloud map.

5. The method of claim 1, wherein the output feature map is generated using a learnable continuous convolution operator.

6. The method of claim 1, comprising:
    controlling the autonomous vehicle based on the output feature map.

7. The method of claim 6, comprising:
    performing, in a point-cloud metric space, and based at least in part on the output feature map, at least one of object detection or motion planning.

8. The method of claim 6, wherein the output feature map is fused with point-cloud data convolution layers.

9. One or more non-transitory computer-readable media storing instructions that are executable by one or more processors to cause an autonomous vehicle control system to perform operations, the operations comprising:
  obtaining image data and point cloud data, the image data and the point cloud data descriptive of an environment of an autonomous vehicle, the image data associated with a camera view;
  for a respective portion of the environment:
    determining one or more datapoints of the point cloud data associated with the respective portion;
    projecting the one or more datapoints of the point cloud data into the camera view;
    determining one or more portions of the image data respectively corresponding to the projected one or more datapoints of the point cloud; and
    generating, based at least in part on the one or more portions of the image data, an output feature associated with the respective portion of the environment; and
  generating an output feature map based at least in part on the output feature, the output feature map corresponding to a two-dimensional overhead view of the environment, the output feature map comprising a fusion of image data features and point cloud data features.

10. The one or more non-transitory computer-readable media of claim 9, wherein the operations comprise:
  obtaining a bird's-eye-view point cloud map associated with the respective portion, the bird's-eye-view point cloud map generated using a bird's-eye-view projection of the point cloud data.

11. The one or more non-transitory computer-readable media of claim 10, wherein the output feature map is characterized by a data structure also associated with the bird's-eye-view point cloud map.

12. The one or more non-transitory computer-readable media of claim 11, wherein the operations comprise:
  generating a dense bird's-eye-view feature map using the output feature map and the bird's-eye-view point cloud map.

13. The one or more non-transitory computer-readable media of claim 9, wherein the output feature map is generated using a learnable continuous convolution operator.

14. The one or more non-transitory computer-readable media of claim 9, wherein the operations comprise:
  controlling the autonomous vehicle based on the output feature map.

15. The one or more non-transitory computer-readable media of claim 14, wherein the operations comprise:
  performing, in a point-cloud metric space, and based at least in part on the output feature map, at least one of object detection or motion planning.

16. The one or more non-transitory computer-readable media of claim 9, wherein the output feature map is fused with point-cloud data convolution layers.

17. An autonomous vehicle control system for controlling an autonomous vehicle, the autonomous vehicle control system comprising:
  one or more processors; and
  one or more non-transitory computer-readable media storing instructions that are executable by the one or more processors to cause the autonomous vehicle control system to perform operations, the operations comprising:
    obtaining image data and point cloud data, the image data and the point cloud data descriptive of an environment of an autonomous vehicle, the image data associated with a camera view;
    for a respective portion of the environment:
      determining one or more datapoints of the point cloud data associated with the respective portion;
      projecting the one or more datapoints of the point cloud data into the camera view;
      determining one or more portions of the image data respectively corresponding to the projected one or more datapoints of the point cloud; and
      generating, based at least in part on the one or more portions of the image data, an output feature associated with the respective portion of the environment; and
    generating an output feature map based at least in part on the output feature, the output feature map corresponding to a two-dimensional overhead view of the environment, the output feature map comprising a fusion of image data features and point cloud data features.

18. The autonomous vehicle control system of claim 17, wherein the operations comprise:
  obtaining a bird's-eye-view point cloud map associated with the respective portion, the bird's-eye-view point cloud map generated using a bird's-eye-view projection of the point cloud data.

19. The autonomous vehicle control system of claim 18, wherein the operations comprise:
  generating a dense bird's-eye-view feature map using the output feature map and the bird's-eye-view point cloud map.

20. The autonomous vehicle control system of claim 17, wherein the output feature map comprises a fusion of image data features and point cloud data features, and wherein the operations comprise:
  performing, in a point-cloud metric space, and based at least in part on the output feature map, at least one of object detection or motion planning.

* * * * *